US012800978B2

(12) United States Patent
Kunai

(10) Patent No.: US 12,800,978 B2
(45) Date of Patent: Nov. 17, 2026

(54) LIGHT DIFFRACTIVE ELEMENT, LIGHT COMPUTING DEVICE, AND METHOD FOR PRODUCING LIGHT DIFFRACTIVE ELEMENT

(71) Applicant: Fujikura Ltd., Tokyo (JP)

(72) Inventor: Yuichiro Kunai, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 487 days.

(21) Appl. No.: 18/274,554

(22) PCT Filed: Jan. 27, 2022

(86) PCT No.: PCT/JP2022/003036

§ 371 (c)(1),
(2) Date: Jul. 27, 2023

(87) PCT Pub. No.: WO2022/176555

PCT Pub. Date: Aug. 25, 2022

(65) Prior Publication Data

US 2024/0310690 A1 Sep. 19, 2024

(30) Foreign Application Priority Data

Feb. 19, 2021 (JP) ................................ 2021-025681

(51) Int. Cl.
*G02F 1/29* (2006.01)
*B82Y 20/00* (2011.01)
(Continued)

(52) U.S. Cl.
CPC .............. *G02F 1/292* (2013.01); *B82Y 20/00* (2013.01); *C09K 19/3809* (2013.01); *G06E 3/005* (2013.01)

(58) Field of Classification Search
CPC ..... G02F 1/292; B82Y 20/00; C09K 19/3809; G06E 3/005; G06E 3/00; G02B 5/18
See application file for complete search history.

(56) References Cited

U.S. PATENT DOCUMENTS

| | | | |
|---|---|---|---|
| 7,847,225 | B2 | 12/2010 | Yokoyama |
| 2006/0050391 | A1 | 3/2006 | Backlund et al. |

(Continued)

FOREIGN PATENT DOCUMENTS

| | | | |
|---|---|---|---|
| JP | 2002275224 | A | 9/2002 |
| JP | 2005232345 | A | 9/2005 |

(Continued)

OTHER PUBLICATIONS

International Search Report issued in corresponding International Application No. PCT/JP2022/003036, dated Apr. 5, 2022 (3 pages).

(Continued)

*Primary Examiner* — Charles S Chang
(74) *Attorney, Agent, or Firm* — Osha Bergman Watanabe & Burton LLP

(57) ABSTRACT

A light diffraction element includes microcells disposed along a plane and each of which includes subcells. Each of the subcells has a refractive index with respect to at least one of in-plane directions of the plane. The refractive index is one of n predetermined refractive indexes, where n is an integer of not less than 2.

11 Claims, 9 Drawing Sheets

(51) Int. Cl.
*C09K 19/38* (2006.01)
*G06E 3/00* (2006.01)

(56) References Cited

U.S. PATENT DOCUMENTS

| | | | | |
|---|---|---|---|---|
| 2021/0048569 | A1 | 2/2021 | Rubin et al. | |
| 2022/0091323 | A1* | 3/2022 | Yaroshchuk ....... | G02B 27/0172 |

FOREIGN PATENT DOCUMENTS

| | | | |
|---|---|---|---|
| JP | 2008523453 | A | 7/2008 |
| JP | 2008532085 | A | 8/2008 |
| WO | 2009133592 | A1 | 11/2009 |
| WO | 2016002691 | A1 | 1/2016 |
| WO | 2016113930 | A1 | 7/2016 |
| WO | 2016113931 | A1 | 7/2016 |

OTHER PUBLICATIONS

Written Opinion issued in corresponding International Application No. PCT/JP2022/003036, dated Apr. 5, 2022, with translation (10 pages).

* cited by examiner

LIGHT DIFFRACTIVE ELEMENT, LIGHT COMPUTING DEVICE, AND METHOD FOR PRODUCING LIGHT DIFFRACTIVE ELEMENT

BACKGROUND

Technical Field

The present invention relates to a light diffraction element including a plurality of microcells, an optical computing device including a plurality of light diffraction elements each of which is the light diffraction element, and a method for producing the light diffraction element.

Description of the Related Art

There is a known light diffraction element which has a light-diffraction structure formed on one of the main surfaces of a substrate of the light diffraction element, the light-diffraction structure including a plurality of microcells each of which has an individually set thickness or refractive index and optically performing a predetermined computation by causing waves of light having passed through the respective microcells to interfere with each other. As used herein, the term "microcell" refers to a cell having a cell size of, for example, less than 10 μm. Further, the term "cell size" refers to the square root of the area of a cell.

An optical computing device in which a plurality of light diffraction elements are used advantageously operates faster and consumes lower power than does an electrical computing device in which a processor is used. Patent Literature 1 discloses an optical neural network having an input layer, an intermediate layer, and an output layer. The light diffraction element described above is capable of being used as, for example, the intermediate layer of such an optical neural network.

PATENT LITERATURE

Patent Literature 1: U.S. Pat. No. 7,847,225

Incidentally, in a case where the respective thicknesses of a plurality of microcells (200×200 microcells herein) A are individually set in the light diffraction element, the configuration illustrated in FIG. 15 can be employed.

A light diffraction element 110 illustrated in FIG. 15 includes a substrate 111 formed by a layered member having light transparency and a light-diffraction structure 112. The light-diffraction structure 112 includes a plurality of microcells A formed on one main surface 1111 of the substrate 111. The microcells A of the light-diffraction structure 112 each has a square bottom face. The light-diffraction structure 112 therefore has a cell size that matches the length L of a side of the bottom face.

In a case of the light-diffraction structure 112, by individually setting the respective thicknesses of the plurality of microcells A, phase shift amounts of waves of signal light LS that pass through the respective microcells A are set. In the light-diffraction structure 112, the waves of the signal light LS, each of which has a phase shifted according to the thickness of the corresponding microcell A, are caused to interfere with each other. With this configuration, the light diffraction element 112 optically carries out a predetermined computation. Note that the signal light LS is illustrated only for the microcell A that is enlarged to be illustrated, in FIG. 15.

Although a light diffraction element in which the thicknesses of a plurality of microcells are individually set, as described above, is known, a light diffraction element in which the refractive indexes of a plurality of microcells are individually set is not known.

SUMMARY

One or more embodiments provide a light diffraction element in which the refractive indexes of a plurality of microcells are individually set.

A light diffraction element in accordance with one or more embodiments employs a configuration in which the light diffraction element includes a plurality of microcells disposed along a specific plane, the plurality of microcells each including a plurality of subcells, the plurality of subcells each having a refractive index with respect to at least one of in-plane directions of the specific plane, the refractive index being any of n predetermined refractive indexes, where n is an integer of not less than 2.

An optical computing device in accordance with one or more embodiments employs a configuration in which the optical computing device includes N light diffraction elements each of which is the light diffraction element described in the above aspect, where N is an integer of not less than 2, the N light diffraction elements having respective regions which coincide with each other, the respective regions each having the plurality of microcells provided therein.

A light diffraction element production method in accordance with one or more embodiments is a method for producing a light diffraction element that includes a plurality of microcells each of which includes a plurality of subcells. According to the present production method, the plurality of subcells each include: multi-block copolymers each of which includes a first segment that includes a block polymer containing a mesogenic group having liquid crystallinity and a second segment that includes a block copolymer not containing the mesogenic group, the first segment and the second segment being alternately attached to each other, and the total number of segments of each of which is not less than 2; and a guide for making the multi-block copolymers self-organized, and the method includes the steps of: providing the guide on a main surface of a substrate such that the mesogenic group in each of the plurality of subcells has an orientation direction which is an any of n predetermined orientation directions; and forming the multi-block copolymers such that the multi-block copolymers cover the guide.

According to one or more embodiments, it is possible to provide a light diffraction element in which the refractive indexes of a plurality of microcells are individually set, and an optical computing device.

DESCRIPTION OF THE EMBODIMENTS

Example 1

Figure 1:
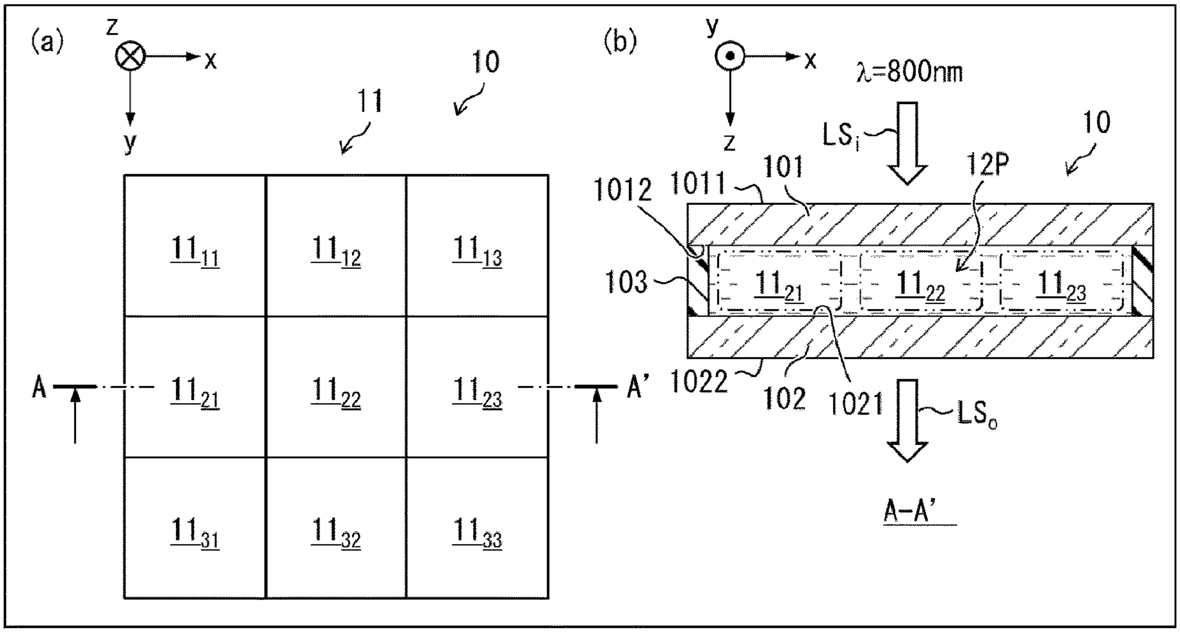
FIG. 1 is a schematic view illustrating the arrangement of a plurality of microcells of a light diffraction element in accordance with Example 1 and a schematic view of a cross section of the light diffraction element.
Figure 2:
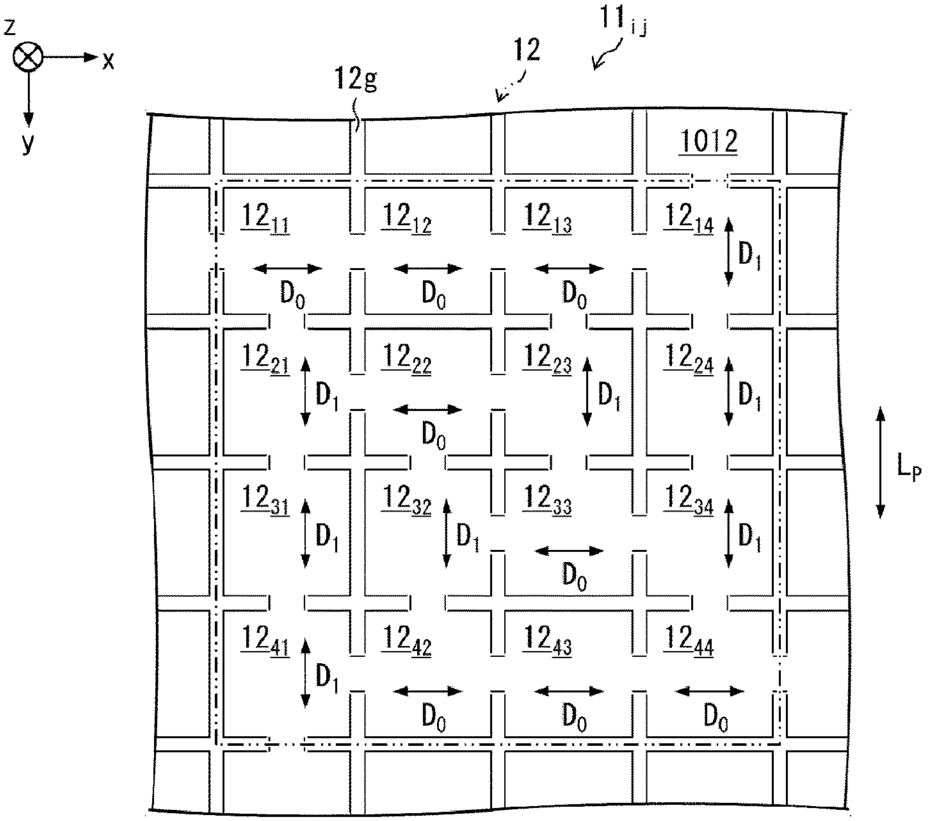
FIG. 2 is a schematic view illustrating the arrangement of a plurality of subcells of each microcell of the light diffraction element illustrated in FIG. 1.
Figure 3:
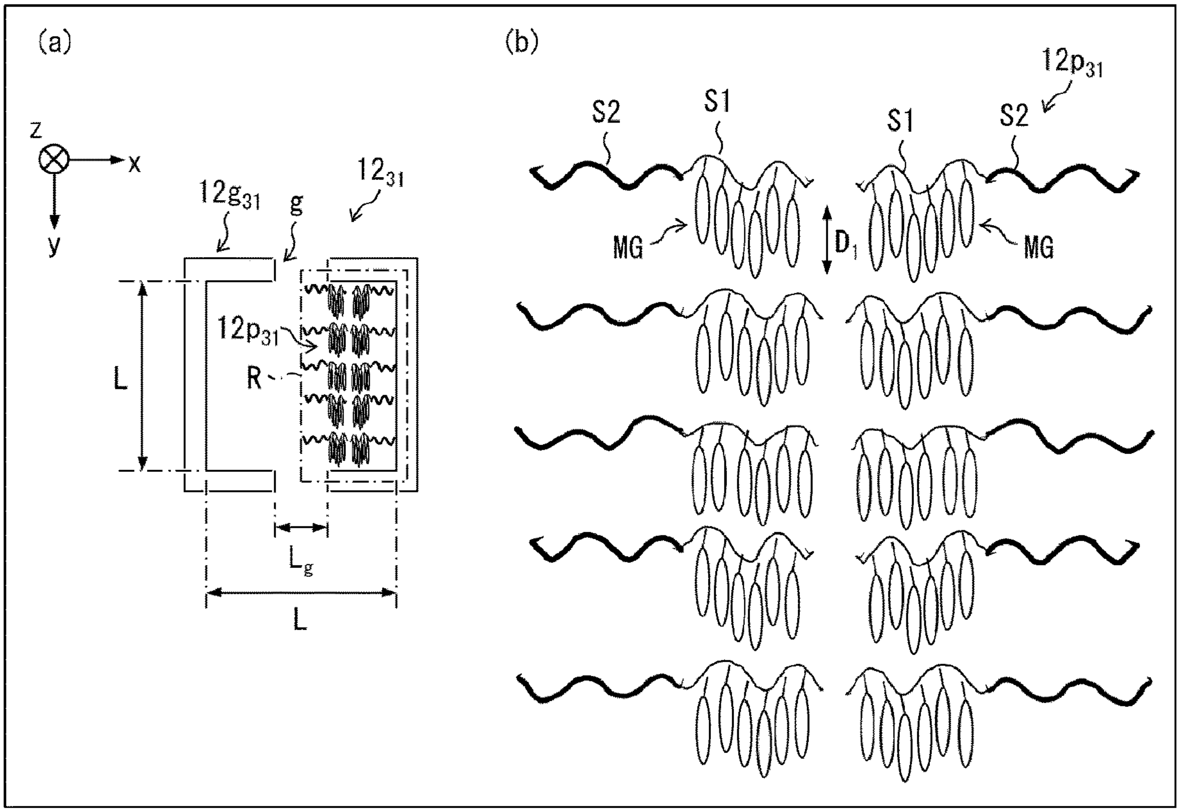
FIG. 3 is a schematic view of the subcell illustrated in FIG. 2 and a schematic view illustrating diblock copolymers contained in the subcell.
Figure 4:
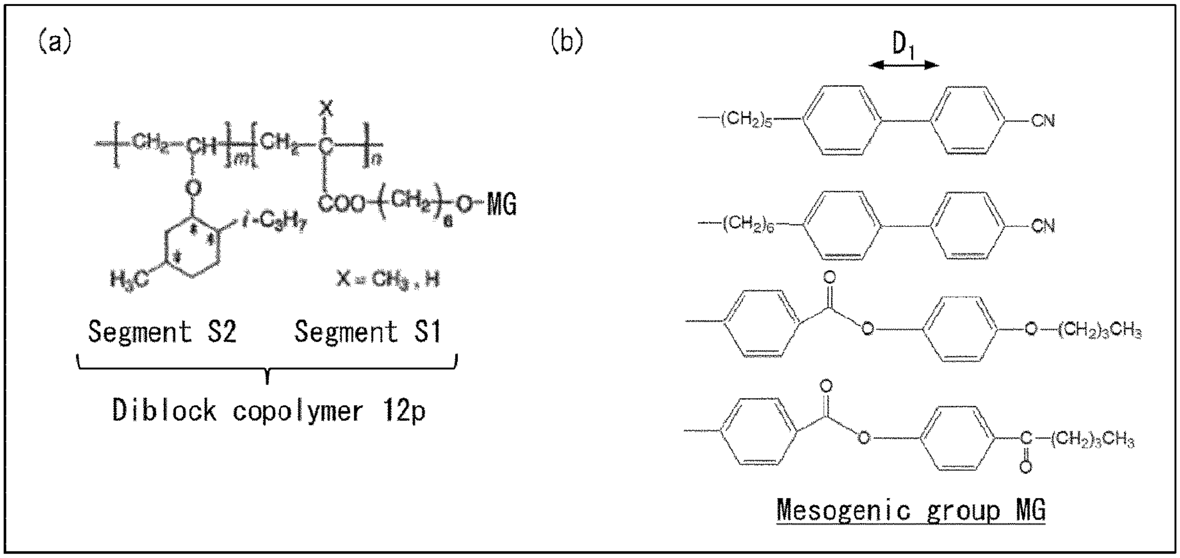
FIG. 4 is the structural formula of the diblock copolymers illustrated in (b) of FIG. 3 and the structural formula of a mesogenic group contained in a first segment of the diblock copolymers.

The following description will discuss a light diffraction element 10 in accordance with Example 1 with reference to FIGS. 1 to 5. (a) of FIG. 1 is a schematic view of the arrangement of a plurality of microcells $\mathbf{11}_{ij}$ of the light diffraction element 10. i, j are integers that satisfy 1≤i, j≤3. (b) of FIG. 1 is a schematic view of a cross section of the light diffraction element 10 along the line A-A' (see (a) of FIG. 1). FIG. 2 is a schematic view of the arrangement of a plurality of subcells of the microcell $\mathbf{11}_{ij}$. (a) of FIG. 3 is a schematic view of a subcell $\mathbf{12}_{31}$. (b) of FIG. 3 is a schematic view of diblock copolymers $\mathbf{12P}_{31}$ contained in the subcell $\mathbf{12}_{31}$. (a) of FIG. 4 is the structural formula of diblock copolymers 12P. (b) of FIG. 4 is the structural formula of an example of a mesogenic group contained in a segment S1 of the diblock copolymers.

In FIG. 1, an orthogonal coordinate system is defined such that the main surfaces of substrates 101 and 102 included in the light diffraction element 10 are parallel to an xy plane, and the normal direction of the substrates 101 and 102 is a z-axis direction. Further, in the xy plane, the direction parallel to the row of a matrix in which the microcells $\mathbf{11}_{ij}$ are arranged is defined as an x-axis direction, and the direction parallel to the column of the matrix is defined as a y-axis direction. Furthermore, the propagation direction of signal light $LS_i$ and $LS_o$ (see (b) of FIG. 1) is defined as a positive z-axis direction, the direction in which the column number increments in each of the microcells $\mathbf{11}_{ij}$ is defined as a positive x-axis direction, and the direction in which the row number increments in each microcell $\mathbf{11}_{ij}$ is defined as a positive y-axis direction.

The coordinate systems illustrated in FIGS. 2 and 3 are the same as the coordinate system illustrated in FIG. 1.

<Overview of Light Diffraction Element>

The light diffraction element 10 is configured such that the respective refractive indexes of the microcells $\mathbf{11}_{ij}$ are individually set so that the phase shift amount of each wave of signal light passing through the corresponding microcells $\mathbf{11}_{ij}$ is set. The signal light has a wavelength λ that can be determined as appropriate so as to fall within a wavelength band of not less than 360 nm and not more than 1000 μm, according to the intended use of the light diffraction element, in the stage of designing the light diffraction element. This band is constituted by a visible range (not less than 360 nm and less than 830 nm), a near-infrared range (not less than 830 nm and less than 2 μm), a mid-infrared range (not less than 2 μm and less than 4 μm), and a far-infrared range (not less than 4 μm and not more than 1000 μm). In Example 1, λ=400 nm is employed as the wavelength λ of the signal light $LS_i$ and $LS_o$. The wavelength λ may belong to at least some of the wavelengths included in the band of not less than 360 nm and not more than 1000 μm.

In (b) of FIG. 1, the signal light that enters the light diffraction element 10 is referred to as the signal light $LS_i$ as a whole, and the signal light that exits from the light diffraction element 10 is referred to as the signal light $LS_o$ as a whole.

When the signal light enters the light diffraction element 10 and passes through the microcells $\mathbf{11}_{ij}$, waves of the signal light undergo phase shift according to the respective refractive indexes of the microcells $\mathbf{11}_{ij}$. The light diffraction element 10 causes waves of the signal light $LS_o$ that exits from the respective microcells $\mathbf{11}_{ij}$, the waves of the signal light $LS_o$ having undergone phase shift, to interfere with each other. With this configuration, the light diffraction element 10 optically carries out a predetermined computation.

<Configuration of Light Diffraction Element>

As illustrated in (b) of FIG. 1, the light diffraction element 10 is constituted by microcells $\mathbf{11}_{11}$ to $\mathbf{11}_{13}$, $\mathbf{11}_{21}$ to $\mathbf{11}_{23}$, and $\mathbf{11}_{31}$ to $\mathbf{11}_{33}$ which forms a microcell group 11, the microcell group 11 consisting of nine microcells and being arranged in a matrix of 3 rows and 3 columns. In Example 1, the light diffraction element 10 includes: a pair of substrates 101 and 102; a spacer 103; and diblock copolymers 12P. The microcell group 11 is provided by using the substrates 101 and 102, the spacer 103 and the diblock copolymers 12P.

(Container)

The substrate 101 is a layered member having a pair of main surfaces 1011 and 1012. The substrate 102 is a layered member, and has the same configuration as the substrate 101. The substrate 102 also has a pair of main surfaces 1021 and 1022. The substrate 101 and the substrate 102 are disposed such that the main surface 1012 and the main surface 1021 that are both on the proximity side face each other. In (b) of FIG. 1, the substrate 101 is disposed so as to be closer to the negative side of the z-axis direction and the substrate 102 is disposed so as to be closer to the positive side of the z-axis direction.

In Example 1, an acrylic resin is employed as materials of the substrates 101 and 102. However, the materials of the substrates 101 and 102 only need to be transparent to the signal light $LS_i$ and $LS_o$ having a wavelength λ of 400 nm, and are not limited to a resin typified by an acrylic resin. The materials of substrates 101 and 102 may be glass typified by quartz glass.

The main surface 1011 forms an entrance surface through which the signal light $LS_i$ enters the light diffraction element 10, and the main surface 1022 forms an exit surface through which the signal light $LS_o$ exits from the light diffraction element 10.

Between the substrate 101 and the substrate 102, the spacer 103 having a predetermined thickness is provided. The thickness of the spacer 103 defines the gap between the substrate 101 and the substrate 102 facing each other.

The substrates 101 and 102 and the spacer 103 are joined together to form an enclosed space (see (b) of FIG. 1). This enclosed space is filled with the diblock copolymers 12P. Accordingly, the substrates 101 and 102 and the spacer 103 forms a container that contains the diblock copolymers 12P. The diblock copolymers 12P will be described later with reference to FIGS. 3 and 4.

(Guides and Diblock Copolymers)

Although not illustrated in (b) of FIG. 1, guide 12*g* is provided on the main surface 1012, which is one of the pair of main surfaces of the substrate 101 and which is in contact with the diblock copolymers 12P. The guide 12*g* is made of a material transparent to light having a wavelength λ. The guide 12*g* can undergo patterning to have a desired pattern by, for example, using electron beam lithography to cure a photoresist.

Note that the guide 12*g* has a thickness that may be equal to the thickness of the spacer 103, or may be smaller than the thickness of the spacer 103. As will be described later, the diblock copolymers 12P are triggered by the guide 12*g* to become self-organized and thus become oriented. Accordingly, even when the thickness of the guide 12*g* is smaller than the thickness of the spacer 103, it is possible to make self-organized substantially all of the diblock copolymers 12P.

The diblock copolymers 12P each include mesogenic groups MG having liquid crystallinity. The mesogenic groups MG become oriented so as to conform to either the x-axis direction or the y-axis direction depending on the shape of the guide 12*g*. The structure of the diblock copolymers 12P and the orientation of the mesogenic groups MG will be described later with reference to FIG. 2.

The light diffraction element 10 has an active region through which signal light passes, the active region being divided into regions which are arranged in 3 rows and 3 columns (i.e., 9 regions), as illustrated in (a) of FIG. 1 and each of which is referred to as the microcells $11_{ij}$. Illustrated in (b) of FIG. 1 are microcells $11_{21}$ to $11_{23}$, which are the microcells of the microcells $11_{ij}$ that are on the second row. Further, regions into which each microcell $11_{ij}$ is divided in 4 rows and 4 columns (i.e., 16 regions) are referred to as subcells $12_{kl}$. Note that k and l are integers satisfying 1≤k and 1≤4, respectively. Further, all the subcells $12_{kl}$ are collectively referred to as a subcell group 12.

Thus, in the light diffraction element 10, the microcells $11_{ij}$ are arranged in a matrix along the main surface 1012, which is an example of the specific plane. Each of the microcells $11_{ij}$ includes the plurality of subcells $12_{kl}$.

As used herein, the term "microcell" refers to a cell having a cell size of, for example, less than 10 μm. Further, the term "cell size" refers to the square root of the area of a cell. For example, when the shape of the microcell in plan view is a square, the cell size is the length of a side of the cell. The lower limit of the cell size is not limited to any particular length, but is 1 nm, for example.

In Example 1, the thickness of each of the microcells $11_{ij}$ and the thickness of each of the subcells $12_{kl}$, which constitutes that microcell $11_{ij}$, are both defined by a gap between the substrate 101 and the substrate 102 (i.e., the thickness of the spacer 103). The thickness of each microcell $11_{ij}$ is therefore substantially the same as the thickness of each subcell $12_{kl}$.

When the main surface 1012 is viewed from above along the z-axis direction, the guide 12*g* is provided in the form of a grid so as to delimit the respective subcells $12_{kl}$ each of which is square (see FIG. 2). Note that a cutout g is provided in a part of the guide 12*g* that surrounds each subcell $12_{kl}$. In the description of (a) of FIG. 3, the cutout g and the orientation direction of the mesogenic groups MG are discussed, by taking a subcell $12_{31}$ as an example of the subcells $12_{kl}$. In Example 1, L=100 nm is employed as the length L of a side of each subcell $12_{kl}$. However, the length L is not limited thereto, but may be determined according to the wavelength λ (400 nm in Example 1) of the signal light $L_i$, $L_o$ and the number of gradations of the refractive index of each microcell $11_{ij}$.

The length of a side of each microcell $11_{ij}$ is preferably equal to or smaller than λ, and more preferably equal to or smaller than λ/2, so that the amount of a phase shift which can occur when the signal light $L_i$ passes through the microcells $11_{ij}$ is increased. In Example 1, a length of 200 nm, which corresponds to λ/2, is employed as the length of a side of each microcell $11_{ij}$.

In addition, in Example 1, each microcell $11_{ij}$ is divided into 16 subcells $12_{kl}$. With this configuration, the number of gradations of each microcell $11_{ij}$ is 17 gradations. In a case of employing such an arrangement, L=50 nm should be employed. Note that when each microcell $11_{ij}$ is divided into the subcell group 12 having subcells arranged in N rows and N columns (N is an integer of not less than 2), the number of gradations of each microcell $11_{ij}$ is $N^2+1$.

A guide $12g_{31}$ that defines the subcell $12_{31}$ is provided with two cutouts g. Each of the two cutouts g is provided at a midpoint of a side parallel to the x-axis direction or in the vicinity of the midpoint. Hereinafter, the length of each side of the subcell $12_{31}$, which is square, is referred to as a length L, and the length of the cutouts g is referred to as a length $L_g$. In this case, the length of the guide $12g_{31}$ parallel to the y-axis direction is 2L, and the length of the guide $12g_{31}$ parallel to the x-axis direction is 2 $(L-L_g)$. Thus, in the subcell $12_{31}$, the length of the guide $12g_{31}$ parallel to the y-axis direction is greater than the length of the guide $12g_{31}$ parallel to the x-axis direction.

As above, at least one of the four sides is provided with the cutouts g in each of the subcells $12_{kl}$ so that the length of the guide $12g_{31}$ parallel to the x-axis direction differs from the length of the guide $12g_{31}$ parallel to the y-axis direction.

As described above, the container formed by the substrates 101 and 102 and the spacer 103 is filled with the diblock copolymers 12P. As illustrated in (a) of FIG. 3, each of the subcells $12_{kl}$ (subcell $12_{31}$ in (a) of FIG. 3) is therefore filled with diblock copolymers $12P_{kl}$ (diblock copolymers $12P_{31}$ in (a) of FIG. 3). The diblock copolymers $12P_{kl}$ will be described next, by taking the diblock copolymers $12P_{31}$ as an example. Note that in a case where it is not necessary to identify the subcell of the subcells $12_{kl}$ that includes the diblock copolymers $12P_{kl}$, a simple denotation of diblock copolymer 12P is used.

As illustrated in (b) of FIG. 3 and (a) of FIG. 4, the diblock copolymer 12P typified by the diblock copolymer $12P_{31}$ is a diblock copolymer in which a segment S1 and a segment S2 are attached to each other and the total number of segments of which is two. However, the diblock copolymer 12P may be a multi-block copolymer in which the segment S1 and the segment S2 are alternately attached to each other and the total number of segments of which is not less than 3.

The segment S1 and the segment S2 are an example of the first segment and the second segment, respectively. The block polymer of the segment S1 includes the mesogenic groups MG having liquid crystallinity (see (a) and (b) of FIG. 4). The mesogenic groups MG illustrated in FIG. 4 are 5CB 4'-Pentyl-4-cyanobiphenyl, 4'-Hexoxy-4-cyanobiphenyl, 4-Butoxyphenylbenzoate, and 4-Pnetanoylphenylbenzoate, in the order from top to bottom.

These mesogenic groups MG each include two benzene rings which are bound together in the form of a straight chain. In Example 1, a side-chain direction in which the benzene ring of the mesogenic group MG is linearly bound is assumed to be substantially orthogonal to a main-chain direction in which the main chain of the segment S1 and the segment S2 extends. In (b) of FIG. 3, this side-chain direction is indicated by using an arrow $D_1$.

However, the angle formed by the main chain direction and the side-chain direction in the diblock copolymer 12P is not limited. The block polymer of the segment S2 does not include the mesogenic group MG.

The mesogenic group MG including two benzene rings bound together in the form of a straight chain has a refractive index that has anisotropy. Specifically, such a mesogenic group MG exhibits a high refractive index for linearly-polarized light having a polarization direction parallel to the side-chain direction in which a benzene ring is linearly bound, and exhibits a low refractive index for linearly-polarized light having a polarization direction parallel to the direction orthogonal to the side-chain direction. In (b) of FIG. 3, an oval shape is used as the shape of the mesogenic group MG. The oval figure indicating the mesogenic group MG has: a longer axis direction that corresponds to the polarization direction for which a high refractive index is exhibited; and a shorter axis direction that corresponds to the polarization direction for which a low refractive index is exhibited.

In Example 1, the block polymer of the segment S1 is hydrophilic, and the block polymer of the segment S2 is hydrophobic. In addition, the guide 12*g* described above is surface-treated so as to be hydrophobic.

The segment S2 including the hydrophobic block polymer tends to agglomerate in the vicinity of the guide $12g_{31}$, and the segment S1 including the hydrophilic block polymer tends to move away from the vicinity of the guide $12g_{31}$. As a result, a self-organized force acts because of the arrangement of the diblock copolymers $12P_{31}$.

The polarity of the segment S1, the polarity of the segment S2, and the polarity of the guide 12*g* are not limited to the combination described above. In the light diffraction element 10, it is possible to make the diblock copolymers 12P self-organized, provided that the surface of the guide 12*g* has a polarity of either hydrophobicity or hydrophilicity, one of the segment S1 and the segment S2 is hydrophobic, and the other is hydrophilic.

As described above, in the subcell $12_{31}$, the length of the guide $12g_{31}$ in a direction parallel to the y-axis direction is greater than the length of the guide $12g_{31}$ in a direction parallel to the x-axis direction. Thus, the segments S2 agglomerate in a part of the guide $12g_{31}$, the part being parallel to the y-axis direction. As a result, the diblock copolymers $12P_{31}$ become oriented in the subcell $12_{31}$, as illustrated in (a) and (b) of FIG. 3. In (a) of FIG. 3, only a region R in (a) of FIG. 3, the region R being the right half of the subcell $12_{31}$, is enlarged to be illustrated. Noted that the diblock copolymers $12P_{31}$ become oriented also in the left half region of the subcell $12_{31}$.

As a result, the subcell $12_{31}$ exhibits a high refractive index in a case of the entry of linearly-polarized light having a polarization direction parallel to the side-chain direction (the direction of the arrow $D_1$) of the diblock copolymers $12P_{31}$.

In the microcell $11_{ij}$ illustrated in FIG. 2, subcells $12_{14}$, $12_{21}$, $12_{23}$, $12_{24}$, $12_{32}$, $12_{34}$, and $12_{41}$ as well as the subcell $12_{31}$ are configured such that the length of the guide 12*g* in a direction parallel to the y-axis direction is greater than the length of the guide 12*g* in a direction parallel to the x-axis direction. Accordingly, the side-chain direction of these eight subcells becomes substantially parallel to the arrow $D_1$. The eight subcells therefore exhibit a high refractive index in a case of the entry of linearly-polarized light polarized in a direction parallel to the direction of the arrow $D_1$.

In the microcell $11_{ij}$, subcells $12_{11}$, $12_{12}$, $12_{13}$, $12_{22}$, $12_{33}$, $12_{42}$, $12_{43}$, and $12_{44}$ are configured such that the length of the guide 12*g* in a direction parallel to the x-axis direction is greater than the length of the guide 12*g* in a direction parallel to the y-axis direction. Accordingly, the side-chain direction of these eight subcells becomes substantially parallel to an arrow $D_0$ orthogonal to the arrow $D_1$. The eight subcells therefore exhibit a low refractive index in a case of the entry of linearly-polarized light polarized in a direction parallel to the direction of the arrow $D_1$.

As above, each of the 16 subcells $12_{k1}$ can be either in a state "1" indicating that the refractive index is high or in a state "0" indicating that the refractive index is low, for linearly-polarized light having a polarization direction which is a predetermined direction (e.g., a direction parallel to the arrow $D_1$). In other words, because the orientation direction of each of the mesogenic groups MG in each subcell $12_{k1}$ is either of two predetermined orientation directions (the direction of the arrow $D_0$ and the direction of the arrow $D_1$), each subcell $12_{k1}$ has a refractive index of either of two types with respect to one direction (e.g., the direction of the arrow $D_1$) of in-plane directions of the xy plane. Thus, each microcell $11_{ij}$ can express the 17 gradations ranging from 0 to 16.

The signal light passing through each microcell $11_{ij}$ is affected by the average refractive index for the range of a size approximately the same as the wavelength $\lambda$ (=400 nm). Thus, from the standpoint of signal light, the refractive index of each microcell $11_{ij}$ is the average of the refractive indexes of the 16 subcells $12_{k1}$.

In a case of using, as the mesogenic group MG, 5CB (4-Cyano-4'-pentylbiphenyl) indicated on the top row in (b) of FIG. 4, a difference $\Delta$ between the refractive index for linearly-polarized light having a polarization direction parallel to the arrow $D_1$ and the refractive index for linearly-polarized light having a polarization direction orthogonal to the arrow $D_1$ is approximately 0.2 (as an example in the case of $\lambda$=550 nm). It is therefore preferable, on the assumption of delaying the phase of the signal light by one wavelength (400 nm in Example 1) in the microcell $11_{ij}$ of 17 gradations, which is the maximum number of gradations, that the thickness of each microcell $11_{ij}$ (i.e., each subcell $12_{k1}$) be not less than 3 μm. Note that considering that the mesogenic group MG is bound only to the segment S1 of the segment S1 and the segment S2 of the diblock copolymer 12P, it is preferable that the thickness of each microcell $11_{ij}$ (i.e., each subcell $12_{k1}$) be not less than 6 μm.

(Production Method)

Here is a brief description of a method for producing the light diffraction element 10 illustrated in FIGS. 1 and 2. The present production method includes: a step of providing the guide 12*g*; and a step of filling with the diblock copolymers 12P.

The step of providing the guide 12*g* is a step of providing the guide 12*g* on the main surface 1012 of the substrate 101, which is included in the specific plane, such that the orientation direction of the mesogenic groups MG in each subcell $\mathbf{12}_{k1}$ is any of n predetermined orientation directions. Illustrated in FIG. 2 is an example of the guide 12*g* provided on the main surface 1012. As described above, the guide 12*g* can undergo patterning to have a desired pattern by, for example, using electron beam lithography to cure a photoresist.

Next, a layer of the diblock copolymers 12P is formed so as to cover the main surface 1012 and the guide 12*g*. The method for forming the layer of the diblock copolymers 12P is not limited to any particular method, but it is possible to produce a uniform layer by, for example, applying a solution of the diblock copolymers dissolved in a solvent through a convenient method such as spin coating or spray coating. By carrying out this step, the main surface 1012, having the guide 12*g* provided thereon, is covered by the diblock copolymers 12P. Accordingly, the diblock copolymers 12P of each subcell $\mathbf{12}_{k1}$, which contain the mesogenic groups MG, become self-organized due to the guide 12*g*. This causes the orientation direction of the mesogenic groups MG of each subcell $\mathbf{12}_{k1}$ to be any of the n predetermined orientation directions.

Next, by sandwiching the spacer 103 between the substrate 101 and the substrate 102, it is possible to form a cavity between the substrate 101 and the substrate 102. In this formation, the orientation of the substrate 101 is determined such that the main surface 1012, on which the guide 12*g* is provided, faces the cavity. This spacer 103 can also be used as an alignment mark.

The thickness of the spacer 103 is preferably uniform. The uniform thickness of the spacer 103 allows a uniform spacing between the substrate 101 and the substrate 102.

In a case where no gap is needed between the substrate 101 and the substrate 102, the spacer 103 can be omitted. In this case, the substrate 101, the spacer 103, and the substrate 102 should be stacked such that the spacer 103 directly lies between the substrate 101 and the substrate 102.

<Variation of Subcell>

As illustrated in FIG. 2, each subcell $\mathbf{12}_{k1}$ of the light diffraction element 10 described above may be configured such that the orientation direction of the mesogenic groups MG is either of the two predetermined orientation directions (the direction of the arrow $D_0$ and the direction of the arrow $D_1$), i.e., the refractive index with respect to one direction (e.g., the direction of the arrow $D_1$) of in-plane directions of the xy plane is any of the n predetermined refractive indexes.

Figure 5:
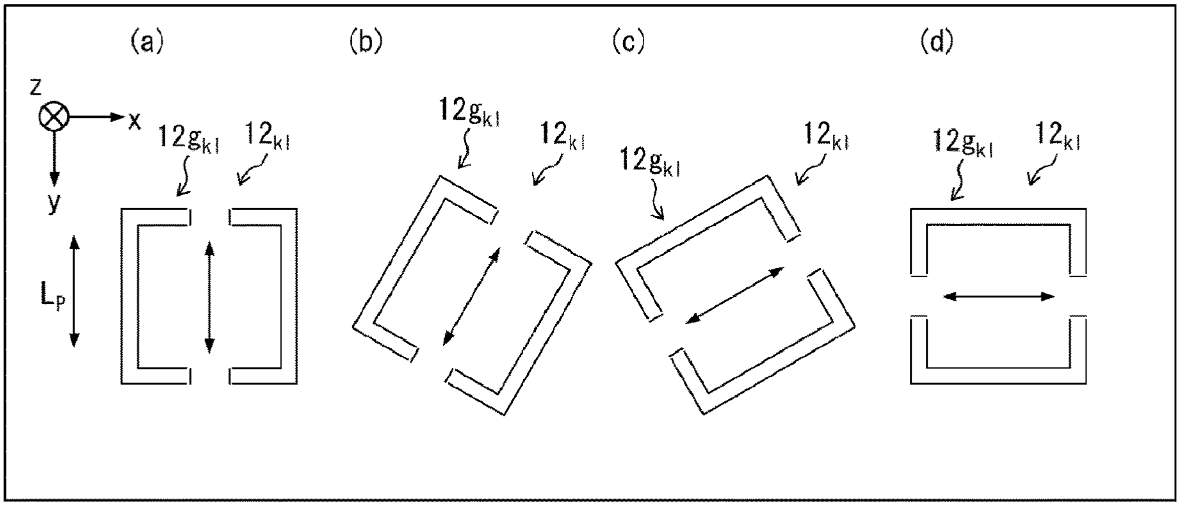
FIG. 5 are schematic views of Variation 1 of the subcell illustrated in (a) of FIG. 3.

(a) to (d) of FIG. 5 are schematic views of Variation 1 of the subcell $\mathbf{12}_{k1}$. In Variation 1, each subcell $\mathbf{12}_{k1}$ is configured such that the orientation direction of the mesogenic groups MG is any of four predetermined orientation directions (the directions of the arrows Do, $D_1$, $D_2$, and $D_3$), i.e., the refractive index with respective to one direction (e.g., the direction of a polarization direction Lp) of in-plane directions of the xy plane is any of four predetermined refractive indexes.

In Variation 1, the above configuration is achieved by selecting the orientation of each subcell $\mathbf{12}_{k1}$ from among four orientations illustrated in (a) to (d) of FIG. 5. Note that the state of the subcell $\mathbf{12}_{k1}$ illustrated in (a) of FIG. 5 is the same as the state of the subcell $\mathbf{12}_{31}$ illustrated in (a) of FIG. 3. The states of the subcell $\mathbf{12}_{k1}$ illustrated in (b) to (d) of FIG. 5 are obtained by rotating clockwise the subcell $\mathbf{12}_{31}$ illustrated in (a) of FIG. 3, in steps of 30°. Arrows illustrated in (a) to (d) of FIG. 5 indicate the orientation directions of the mesogenic groups MG.

Figure 6:
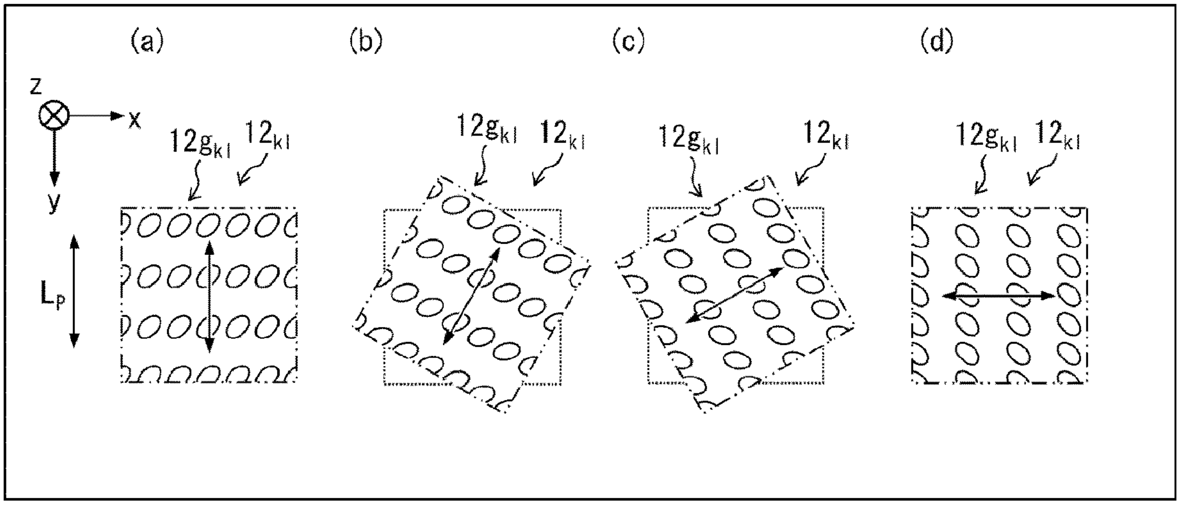
FIG. 6 are schematic views of Variation 2 of the subcell illustrated in (a) of FIG. 3.

Further, each subcell $\mathbf{12}_{k1}$ may be configured such that the guides $\mathbf{12}g_{k1}$ that have the shape of a pin or a dot are used as illustrated in (a) to (d) of FIG. 6, instead of a guide $\mathbf{12}g_{k1}$ having the shape of a grid, so that the mesogenic groups MG are oriented. For example, it is possible to make the mesogenic groups MG oriented by arranging, in a matrix, the guides $\mathbf{12}g_{k1}$ having the shape of a pin or a dot, as described in A. Tavakkoli K. G. et al., "Templating Three-Dimensional Self-Assembled Structures in Bilayer Block Copolymer Films", Science 8 Jun. 2012, Vol. 336, Issue 6086, pp. 1294-1298. Note that in (a) to (d) of FIG. 6, the outline of the subcell $\mathbf{12}_{k1}$ is indicated by a two-dot chain line.

In the state illustrated in (a) of FIG. 6, the guides $\mathbf{12}g_{k1}$ are configured such that the side-chain direction of the mesogenic groups MG becomes parallel to the direction of the polarization direction Lp. The states of the subcell $\mathbf{12}_{k1}$ illustrated in (b) to (d) of FIG. 6 are obtained by rotating clockwise the subcell $\mathbf{12}_{k1}$ illustrated in (a) of FIG. 6, in steps of 30°. Arrows illustrated in (a) to (d) of FIG. 6 indicate the orientation directions of the mesogenic groups MG.

For an easy-to-understand illustration of the rotation of a row direction and a column direction of the guides $\mathbf{12}g_{k1}$ arranged in a matrix, the outline of the subcell $\mathbf{12}_{k1}$ (two-dot chain line), which is square, is also rotated together with the row direction and the column direction, in (b) and (c) of FIG. 6.(*b*). However, in a case of employing the guides $\mathbf{12}g_{k1}$ having the shape of pins or dots, the row direction and the column direction of the guides $\mathbf{12}g_{k1}$ can be rotated without the rotation of the outline of the subcell $\mathbf{12}_{k1}$, as indicated by dashed line. With this configuration, it is possible for the subcells $\mathbf{12}_{k1}$ to be disposed in a close contact with each other. It is thus possible to eliminate a gap that can be left between the subcells $\mathbf{12}_{k1}$.

With this configuration, it is possible to increase the number of gradations that can be achieved in the microcells $\mathbf{11}_{ij}$.

Example 2

Figure 7:
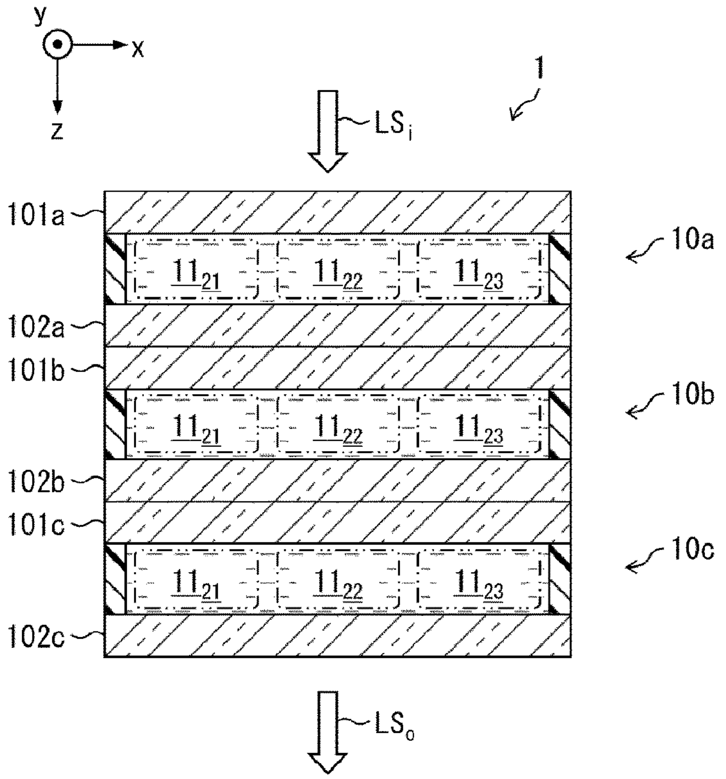
FIG. 7 is a schematic view of a cross section of an optical computing device in accordance with Example 2.

The following description will discuss an optical computing device 1 in accordance with Example 2, with reference to FIG. 7. FIG. 7 is a schematic view of a cross section of the optical computing device 1. As illustrated in FIG. 7, the optical computing device 1 includes three light diffraction elements 10*a*, 10*b*, and 10*c*. The light diffraction elements 10*a*, 10*b*, and 10*c* have the same configuration as the light diffraction element 10 illustrated in FIG. 1, and have letters a, b, and c added to the ends of the reference signs for identification.

In the optical computing device 1, the light diffraction element 10*c*, the light diffraction element 10*b*, and the light diffraction element 10*a* are disposed on top of each other in this order such that regions of the light diffraction elements 10*c*, 10*b*, and 10*a*, the regions each having a plurality of microcells $\mathbf{11}_{ij}$ provided therein, coincide with each other. Among the plurality of microcells $\mathbf{11}_{ij}$ of each of the light diffraction elements 10*c*, 10*b*, and 10*a*, only microcells $\mathbf{11}_{21}$, $\mathbf{11}_{22}$, $\mathbf{11}_{23}$ are illustrated in FIG. 7.

A substrate 102*a* of the light diffraction element 10*a* and a substrate 101*b* of the light diffraction element 10*b* are fixed to each other. A substrate 102*b* of the light diffraction element 10*b* and a substrate 101*c* of the light diffraction element 10*c* are fixed to each other.

The light diffraction elements 10*a*, 10*b*, and 10*c* optically carries out respective predetermined computations. Accordingly, the optical computing device 1 outputs signal light $LS_o$ indicating the result of the predetermined computations performed in sequence on signal light $LS_i$.

Note that in Example 2, the number N (N is an integer of not less than 2) of light diffraction elements 10*a*, 10*b*, and 10*c* of the optical computing device 1 is three. However, N is not limited to three, but can be determined as appropriate according to the purpose of computation.

Reference Example 1

Figure 8:
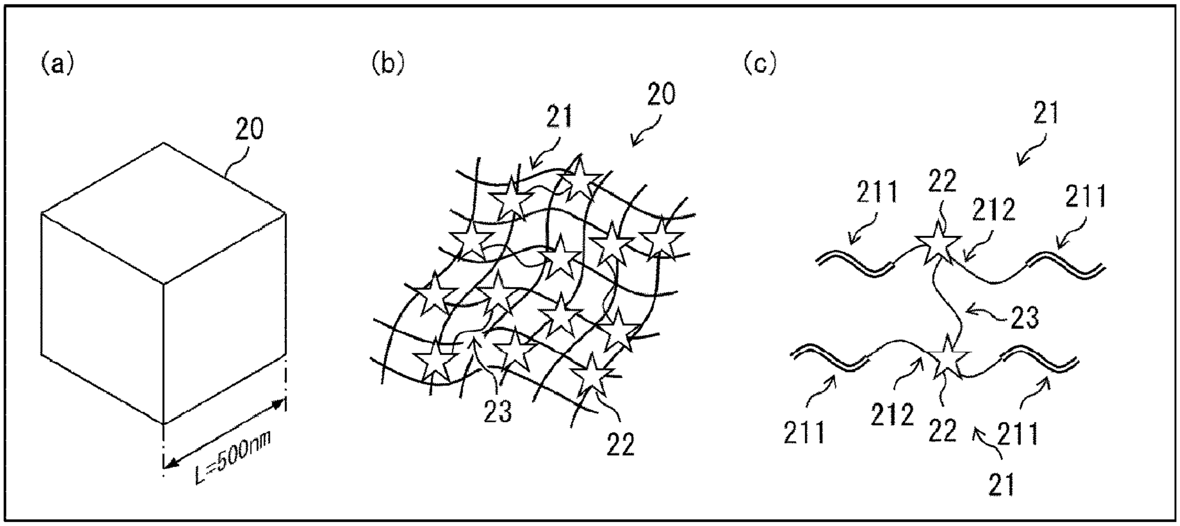
FIG. 8 is a perspective view of a structure in accordance with Reference Example 1, an enlarged schematic view of a part of the structure, and is a schematic view of two triblock copolymers contained in the structure.
Figure 9:
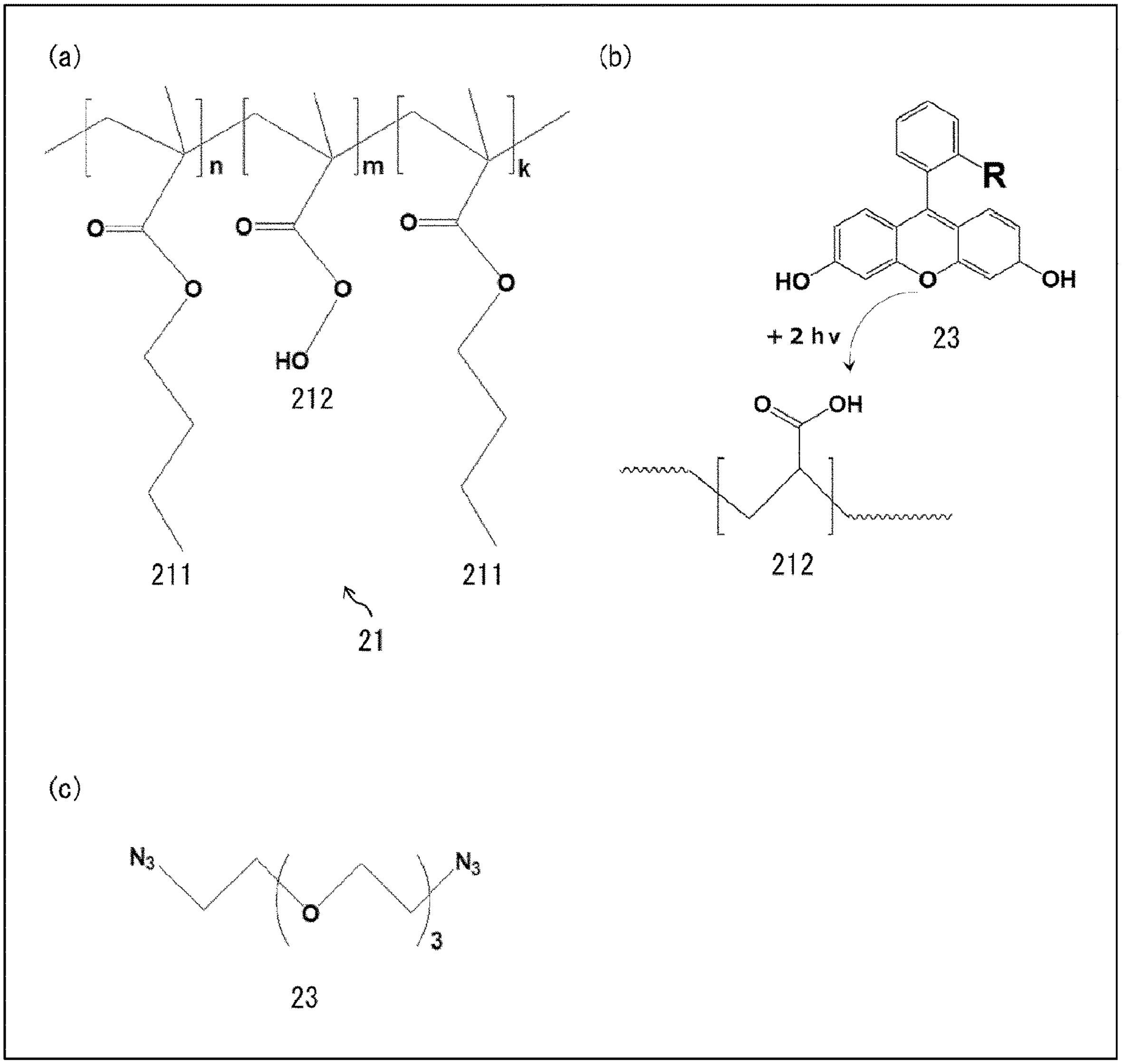
FIG. 9 is the structural formula of the triblock copolymers illustrated in (b) and (c) of FIG. 8, the structural formula of a colorant illustrated in (b) and (c) of FIG. 8, and the structural formula of a cross-linking agent illustrated in (b) and (c) of FIG. 8.

A structure 20 in accordance with Reference Example 1 will be described with reference to FIGS. 8 and 9. (a) of FIG. 8 is a perspective view of the structure 20, (b) of FIG. 8 is an enlarged schematic view of a part of the structure 20, and (c) of FIG. 8 is a schematic view of two triblock copolymers 21 contained in the structure 20. (a) of FIG. 9 is a structural formula of a specific example of the triblock copolymers 21, (b) of FIG. 9 is a structural formula of a specific example of a colorant 22 contained in the structure 20, and (c) of FIG. 9 is a structural formula of a specific example of a cross-linking agent 23 contained in the structure 20.

<Structure>

In Example 2, the shape of the structure 20 is the shape of a cube (see (a) of FIG. 8). However, the structure 20 is not limited to this shape. The shape of the structure 20 can be determined as appropriate according to the pattern used in exposure carried out in an exposing step (see FIGS. 12 and (b) of FIG. 13) included in a production method (described later) in Example 5. Further, the structure 20 is not limited to a three-dimensional structure as illustrated in (a) of FIG. 8, but may have a two-dimensional structure.

According to Example 2, employed as the length L of a side of the structure 20 is 500 nm. Thus, the structure 20 has a nanostructure, which is a nanometer-scale structure. However, the structure of the structure 20 is not limited to a nanostructure, but may be a microstructure, which is a microscale structure. Note that in a case where the existing ImpFab process is used to produce a structure, when the size of the structure is smaller, the shape of the structure more easily deforms due to shrinkage caused in dehydrating and sintering step. Therefore, when the size of the structure 20 is smaller, the effect yielded by the structure 20 and a production method M20 (described later) (see FIGS. 13 to 14) is more remarkable. Specifically, the structure 20 and the production method M20 can be suitably used in a case where a minimum pattern width is less than 10 μm, and can be more suitably used in a case where a minimum pattern width is less than 1 μm. Note that a nanometer-scale structure refers to a structure having a minimum pattern width of less than 1 mm, and a micrometer-scale structure refers to a structure having a minimum pattern width of less than 1 mm.

The structure 20 contains the triblock copolymers 21, the colorant 22, and the cross-linking agent 23 (see (b) of FIG. 8). In (c) of FIG. 8, two of the triblock copolymers 21 contained in the structure 20 are enlarged to be schematically illustrated.

(Triblock Copolymer)

The triblock copolymers 21, which are an example of the multi-block copolymers, have a configuration in which a segment 211 that is hydrophobic and a segment 212 that is hydrophilic are alternately bound together (see (c) of FIG. 8). The segment 211 is an example of the first segment, and the segment 212 is an example of the second segment.

According to Example 2, each of the segment 211 and the segment 212 includes a single block polymer. The block polymer of the segment 211 is hydrophobic, and the block polymer of the segment 212 is hydrophilic. An example of the segment 211 and the segment 212 will be described later with reference to (a) of FIG. 9. However, the segment 211 may include a plurality of hydrophobic block polymers, and the segment 212 may include a plurality of hydrophilic block polymers.

According to Example 2, the segment 211, the segment 212, and the segment 211 are bound together in this order in the triblock copolymer 21. In other words, the triblock copolymer 21 is constituted by two segments 211 and the segment 212 lying between the two segments 211. Therefore, the total number of segments of the triblock copolymer 21 is three. However, the total number of segments is not limited to three, but may be determined as appropriate provided that the total number of segments is not less than three. Therefore, the structure 20 may include multi-block copolymers, instead of triblock copolymers. Note that the total number of segments is preferably an odd number, and more preferably three.

In the production method M20 (described later), used as an intermediate (hereinafter, also referred to as "fine structure producing gel") for producing the structure 20 is a polymer gel (hydrogel in the production method M20) obtained by allowing the triblock copolymers 21 to swell in a solvent (water in the production method M20). With the total number of segments being an odd number, block polymers having the same polarity are located at the opposite ends of the triblock copolymer 21. This allows easy agglomeration of end portions of the plurality of triblock copolymers 21, in forming a polymer gel. In addition, with the total number of segments being three, it is possible to prevent agglomeration of portions of the plurality of triblock copolymers 21, the portions being other than the end portions. It is therefore easy to make uniform the pitch in a polymer matrix of the polymer gel.

Note that used, in preparing a fine structure producing gel, as a solvent in which to disperse the triblock copolymers 21 in accordance with Example 2 is expected to be water, which is an example of a hydrophilic solvent. Therefore, a triblock copolymer having the segments 211 located at the opposite ends thereof is employed as the triblock copolymer 21. In a case of using a hydrophobic solvent in preparing the fine structure producing gel, a triblock copolymer having the segments 212 located at the opposite ends thereof should be employed as the triblock copolymer 21.

(Colorant and Cross-Linking Agent)

As illustrated in (b) and (c) of FIG. 8, at least any of the plurality of triblock copolymers 21 has the colorant 22 bound to the segment 212 lying between the segments 211 located at the opposite ends of that triblock copolymer 21. In addition, the cross-linking agent 23 forms a cross-link between such colorants 22. Accordingly, cross-links are formed between at least some of the plurality of triblock copolymers 21, via the colorants 22.

In a case of employing, as the triblock copolymer 21, a triblock copolymer having the segments 212 located at the opposite ends thereof, the colorant 22 should be bound to the segments 211 lying between the two segments 212.

(Specific Example of Block Polymer, Colorant, and Cross-Linking Agent)

The block polymer of the segment 211 of the triblock copolymer 21 is, for example, poly(butyl methacrylate) (PBMA). The block polymer of the segment 212 of the triblock copolymer 21 is, for example, poly(methyl methacrylate) (PMMA). In the specific example illustrated in (a) of FIG. 9, the degree of polymerization n of the segment 211 on the left side is n=134, the degree of polymerization m of the segment 212 is m=273, and the degree of polymerization k of the segment 211 on the right side is k=192.

The block polymer of the segment 211 and the block polymer of the segment 212 are not limited to PBMA and PMMA, respectively. Examples that are suitably used as an alternative to the block polymer of the segment 211 include, but not limited to, methacrylates and acrylates that have an alkyl chain, such as poly(hexyl methacrylate) and poly(octyl methacrylate). Such examples can also include polymers having a hydrophobic side chain that contains, for example, an alicyclic functional group or an alkyl fluoride. Examples of an alternative to the block polymer of the segment 212 include, but not limited to, methacrylates and acrylates that have a carboxyl group, such as poly(acrylic acid). Such examples can include a polymer containing a functional group that is capable of reacting with a desired colorant.

The segments 212, to which the colorant 22 is bound, has a molecular weight dispersion which is preferably not more than 3, more preferably not more than 2, and most preferably not more than 1.2, the molecular weight dispersion being a ratio ($M_w/M_n$) between a number-average molecular weight ($M_n$) and a weight-average molecular weight ($M_w$) that are measured in a GPC measurement and calculated on the basis of polystyrene standards. A narrower molecular weight dispersion means that the block polymer has a chain length distribution which fits into a narrower range, and thus allows formation of a hydrogel having a more uniform mesh structure.

The molecular weight dispersion of the segment 212 should be determined as appropriate depending on whether the minimum pattern width of the microstructure or nanostructure of the structure 20 to be produced is great or small. When the minimum pattern width is smaller, the molecular weight dispersion of the segment 212 is preferably lower. Like the segment 212, the molecular weight dispersion of the segment 211 is preferably lower. The segment 211 and the segment 212 can be produced by using a precision polymerization method such as living radical polymerization. It is therefore possible to make the molecular weight dispersion lower.

The segment 212 contains a block component in a proportion which, when measured by 13C-NMR, preferably satisfies not less than 80% and not more than 100%, and is more preferably not less than 90%. The proportion of the block component can be calculated from the Triad sequence information in the 13C-NMR measurement. The proportion of the block component shall be defined as follows.

$$\text{(Proportion of block component)} = \text{(fractions all of which are the same unit)}/\text{(all fractions)} \times 100(\%)$$

Note that in a case where the block polymer consists of more than one kind of monomer, when all of the Triad components are the same, such a fraction is counted as the numerator of the above formula. For example, in a case where the block copolymer consists of two kinds of monomers which are a monomer A and a monomer B, a fraction of "AAA" and a fraction of "BBB" are counted as the numerator, but the other fractions that contain different units, such as "BAB" and "ABA", are not counted as the numerator. The proportion of the block component being not less than 80% makes it possible to build a gel having a mesh structure which is better controlled.

Examples of the colorant 22 include fluorescein, which is one of fluorescent dyes, and a colorant obtained by substituting a substituent R for the carboxyl group in fluorescein (see (b) of FIG. 9). As the substituent R, a cross-linking agent 23 (described later) is used. It should be noted that as in the variation (described later) of the structure 20, when a crosslink is not formed between the triblock copolymers 21, an amino group ($NH_2$), a thiol group (SH), or biotin can be used as the substituent R.

The cross-linking agent 23 is a water-based cross-linking agent for resins, and examples thereof may include a diazide having a water-soluble backbone, such as 1,11-diazido-3,6,9-trioxaundecane (see (c) of FIG. 9). In a case where diazides or the like are used as the cross-linking agent in a cross-linking reaction, it is preferable that a substituent to be introduced into the colorant 22 be a functional group having an unsaturated bond, such as a double bond or a triple bond.

<Light Diffraction Element>

Figure 10:
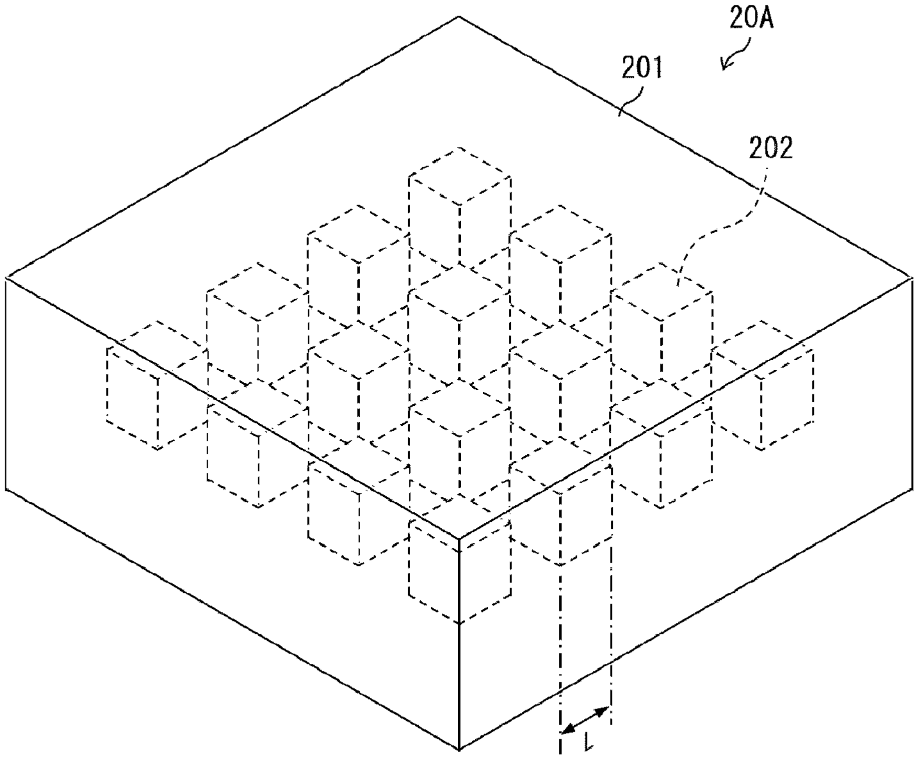
FIG. 10 is a perspective view of a light diffraction element in accordance with Example 3.
Figure 11:
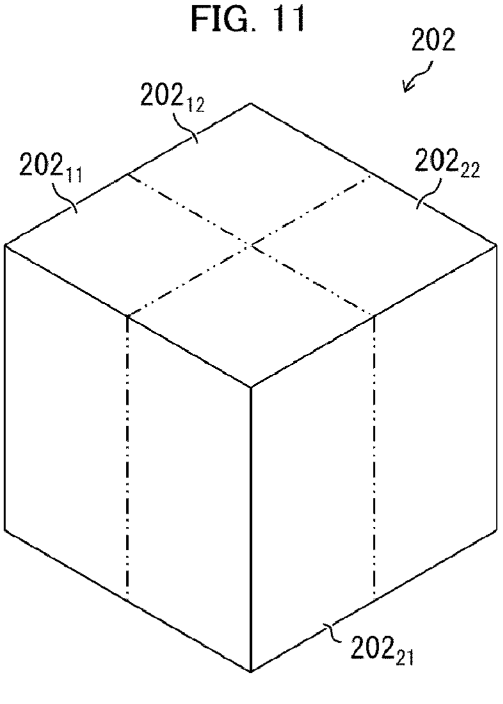
FIG. 11 is a perspective view of a microcell included in the light diffraction element illustrated in FIG. 10.

The following description will discuss a light diffraction element 20A in accordance with Example 3, with reference to FIGS. 10 and 11. FIG. 10 is a perspective view of the light diffraction element 20A. FIG. 11 is a perspective view of a microcell 202 included in the light diffraction element 20A. The light diffraction element 20A can also be a variation of the structure 20 illustrated in FIG. 8.

Like the structure 20, the light diffraction element 20A has a nanostructure. Further, like the structure 20, the light diffraction element 20A contains triblock copolymers each of which includes a first segment 211 that is hydrophobic and a second segment 212 that is hydrophilic, the first segment and the second segment 212 being alternately bound together, and the total number of segments of each of which is three.

(Microcell)

The triblock copolymers contained in the light diffraction element 20A however differ from the triblock copolymers 21 ((b) and (c) of FIG. 8) contained in the structure 20 in that what is bound to a colorant 22 is not a cross-linking agent 23 but nanoparticles. In the present variation, the microcells 202 containing nanoparticles will be described. The microcell 202 forms a part of the triblock copolymer, and is a region in which nanoparticles made of diamond are bound to the colorant 22.

In the triblock copolymers contained in the light diffraction element 20A, the colorant 22 and the nanoparticles are bound in this order to the segment 212, which is one of the segment 211 and the segment 212 and which lies between two segments 211 located at the opposite ends of the triblock copolymer, as described above.

The nanoparticles are configured so as to have a refractive index greater than the refractive index of a polymer matrix that contains the segment 211 and the segment 212. In the present variation, nanoparticles made of diamond are employed as the nanoparticles. However, the material of the nanoparticles is not limited to diamond, but may be gold, silver, copper, or platinum, or may be a carbon nanotube, a fullerene, titanium oxide, or silica. Further, it is not necessary to use one of these materials singly, but a blend or an alloy of these materials may be used.

As a result, the refractive index of a region of the triblock copolymer, the region having the colorant 22 and the nanoparticles bound to the segment 212, is greater than the refractive index of a region of the triblock copolymer, the region having neither the colorant 22 nor the nanoparticle bound to the segment 212. In the following description, the region having neither the colorant 22 nor the nanoparticle bound to the segment 212 is referred to as a low refractive index portion 201, and the region having a higher refractive index than the low refractive index portion 201 due to the nanoparticles is referred to as the microcell 202.

The refractive index of the triblock copolymers 21 of the low refractive index portion 201 is, for example, 1.4.

The refractive index of diamond employed as the material of the nanoparticles is 2.42. The refractive index of the microcell 202 depends on the density of the nanoparticles in the microcell 202. The density of the nanoparticles in turn depends on the density of the colorants 22 bound to the segments 212 and the particle diameter of the nanoparticles bound to the colorants 22. When the density of the colorants 22 bound to the segments 212 is greater, it is possible for the microcell 202 to contain a larger number of nanoparticles. In addition, when the particle diameter of the nanoparticles is greater, it is possible to make greater the volume per nanoparticle. Note that as will be described later with reference to FIG. 11, in a case where subcells $\mathbf{202}_{11}$, $\mathbf{202}_{12}$, $\mathbf{202}_{21}$, and $\mathbf{202}_{22}$ have different refractive indexes in the microcell 202, the refractive indexes should be controlled by controlling the density of the colorants 22. The density of the colorants 22 can be controlled through the amount of exposure in an exposing step S13 illustrated in FIGS. 13 and 14. When the amount of exposure in the exposing step S13 is greater, the density of the colorants 22 is higher.

It is thus possible for the refractive index of the microcell 202 to be determined as appropriate so as to be within a range of not less than 1 and less than 2.42. In other words, it is possible for a difference Δ in the refractive index between the low refractive index portion 201 and the microcell 202 to be determined as appropriate so as to be within a range of $0 \leq \Delta \leq 1.02$, in the light diffraction element 20A.

Figure 15:
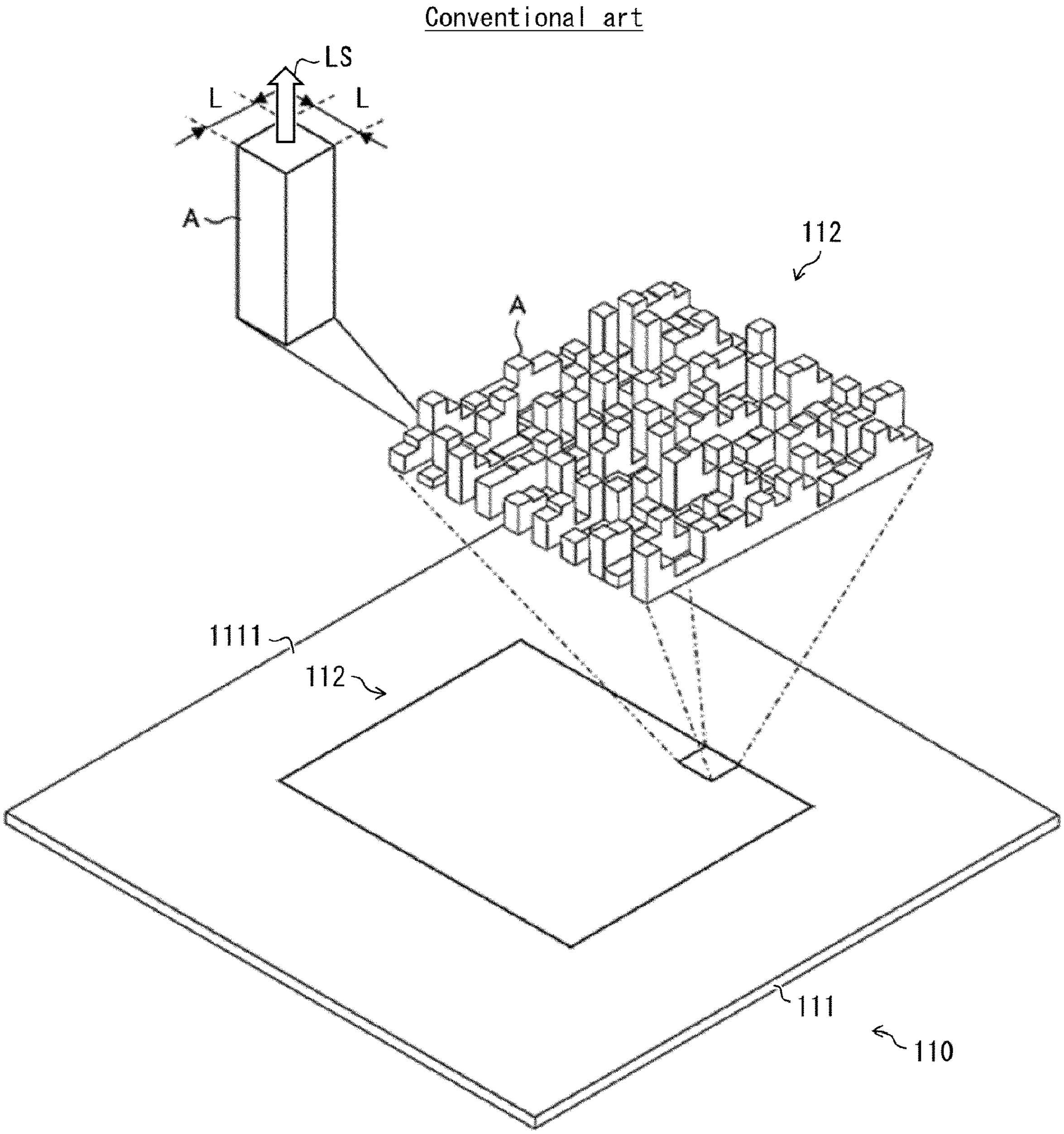
FIG. 15 is a perspective view of a conventional light diffraction element.

In the light diffraction element 110 illustrated in FIG. 15, the refractive index of a resin of the microcells A is 1.5, and thus, the difference in refractive index from air (having a refractive index of 1) surrounding the microcells A is approximately 0.5. It is therefore possible to make the microcell 202 thinner for the light diffraction element 20A than for the light diffraction element 110.

According to Example 3, the low refractive index portion 201 has the shape of a block which is a rectangular parallelepiped. The size of the low refractive index portion 201 is such that the length of a side of the pair of bottom walls is 4.5 μm and the thickness of the low refractive index portion 201 is 1.5 μm.

According to Example 3, each of the microcells 202 has the shape of a columnar pillar. The size of each microcell 202 is such that the length L of a side of the pair of bottom faces is 500 nm and the thickness of each microcell 202 is 550 nm. The microcells 202 are embedded in the low refractive index portion 201 so as to be arranged along a main surface of the low refractive index portion 201 and in a matrix of four rows and four columns. The main surface of the low refractive index portion 201 is an example of the specific plane. In FIG. 10, only one, out of 16 microcells 202, is assigned a reference sign.

(Subcell)

As illustrated in FIG. 11, each microcell 202 is constituted by four subcells $\mathbf{202}_{11}$, $\mathbf{202}_{12}$, $\mathbf{202}_{21}$, and $\mathbf{202}_{22}$ arranged in two rows and two columns. However, the number of subcells that constitute each microcell 202 is not limited to four, but can be determined as appropriate according to a desired number of gradations.

Each of the subcells $\mathbf{202}_{11}$, $\mathbf{202}_{12}$, $\mathbf{202}_{21}$, and $\mathbf{202}_{22}$ is configured to have either of two predetermined refractive indexes which are 1.4 and 2.42. According to Example 3, the refractive index is controlled according to the density of the nanoparticles. Thus, the refractive index of each of the subcells $\mathbf{202}_{11}$, $\mathbf{202}_{12}$, $\mathbf{202}_{21}$, and $\mathbf{202}_{22}$ is isotropic, and is 1.4 or 2.42 with respect to all directions. The number of gradations of the microcells 202 configured as such is five.

The predetermined types of refractive indexes that can be adopted by each of the subcells $\mathbf{202}_{11}$, $\mathbf{202}_{12}$, $\mathbf{202}_{21}$, and $\mathbf{202}_{22}$ are not limited to two types, but can be set as appropriate from among a plurality of types.

The shape and size of the low refractive index portion 201 and the microcells 202 are not limited to those of the present variation, but may be determined as appropriate. The microcells 202 may be embedded in the low refractive index portion 201, as illustrated in FIG. 10, or may be exposed on a pair of main surfaces of the low refractive index portion 201. In a case where the microcells 202 are exposed on the main surfaces of the low refractive index portion 201, the thickness of the microcells 202 is equal to the thickness of the low refractive index portion 201.

<Optical Computing Device>

As illustrated in FIG. 10, the plurality of microcells 202 arranged in a matrix are embedded in a single layer in the low refractive index portion 201, in the light diffraction element 20A. However, one or more embodiments can also employ a configuration in which the plurality of microcells 202 arranged in a matrix are embedded in each of a plurality of layers in the low refractive index portion 201. In this case, regions of the respective layers, the regions each having the plurality of microcells 202 provided therein, coincide with each other.

With this configuration, it is possible to use the configuration in which the plurality of microcells 202 are embedded in the low refractive index portion 201, to provide an optical computing device similar to the optical computing device illustrated in FIG. 7. With this configuration, it is also possible to produce an optical computing device without exposing the plurality of microcells 202 to the air.

Reference Example 2

Figure 12:
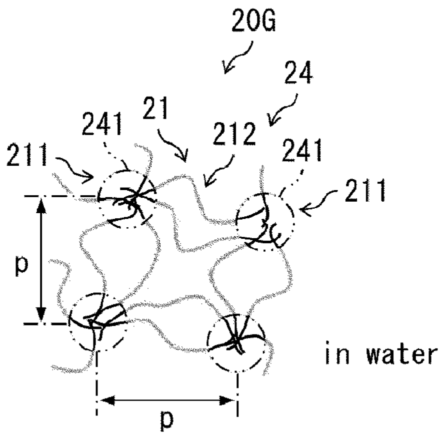
FIG. 12 is a schematic view of a gel in accordance with Reference Example 2.

The following description will discuss a gel 20G in accordance with Reference Example 2, with reference to FIG. 12. FIG. 12 is a schematic view of the gel 20G. Note that for convenience of description, a member having the same function as the member described in the above Examples is assigned the same reference sign, and the description thereof is not repeated.

The gel 20G is an example of the fine structure producing gel for producing the structure 20 and the light diffraction element 20A that are described above. The gel 20G contains water and triblock copolymers in each of which a first segment 211 and a second segment 212 are alternately bound together and the total number of segments of each of which is three. The first segment 211 and the second segment 212 each include one or more block copolymers. The first segment 211 is hydrophobic and the second segment 212 is hydrophilic. Note that the triblock copolymers may be multi-block copolymers, as described above.

The gel 20G is obtained by dispersing, in water that is an example of a hydrophilic solvent, triblock copolymers 21 which contains the segments 211 and the segments 212 and in which a colorant 22 is not bound to the segments 212, and thereby allowing the block copolymers 21 to swell.

Each of the triblock copolymers 21 includes, at the opposite ends thereof, the segments 211 that are hydrophobic and includes, between the segments 211, the segment 212 that is hydrophilic. By dispersing such triblock copolymers 21 in water, a polymer matrix 24 as illustrated in FIG. 12 is formed. The polymer matrix 24 includes: water which is a solvent; quasi cross-linking points 241 formed through the agglomeration of the segments 211; and the segment 212 lying between the two cross-linking points 241. Although the polymer matrix 24 is illustrated so as to have a two-dimensional structure in FIG. 12 for ease in understanding the structure of the polymer matrix, the polymer matrix 24 actually has a three-dimensional structure.

It is possible to produce the segment 211 and the segment 212 of the triblock copolymer 21 by a precision polymerization method, as described above. The block polymers of the segment 211 and the segment 212 therefore have a low molecular weight dispersion. The molecular weight dispersions of the segment 211 and the segment 212 in the block polymer are, for example, preferably not more than 2, and more preferably not more than 1.2. As described above, the degree of polymerization of each of the segments 211 and the segments 212 is precisely controlled. This makes it possible to reduce variation that can be produced in a pitch p between the cross-linking points 241 in the polymer matrix 24.

According to Example 3, the polymer matrix 24 is formed with use of the triblock copolymers each including the segments 211 located at the opposite ends thereof and the segment 212 lying between the segments 211. Thus, water, which is an example of a hydrophilic solvent is employed as the solvent. Examples of the hydrophilic solvent other than water include dimethyl sulfoxide (DMSO) and dimethylformamide (DMF).

Alternatively, in a case where the polymer matrix 24 is formed with use of the triblock copolymers each including the segments 212 located at the opposite ends thereof and the segment 211 lying between the segments 212, a hydrophobic solvent should be employed as the solvent. Examples of the hydrophobic solvent include normal hexane and cyclohexane.

Example 4

Figure 13:
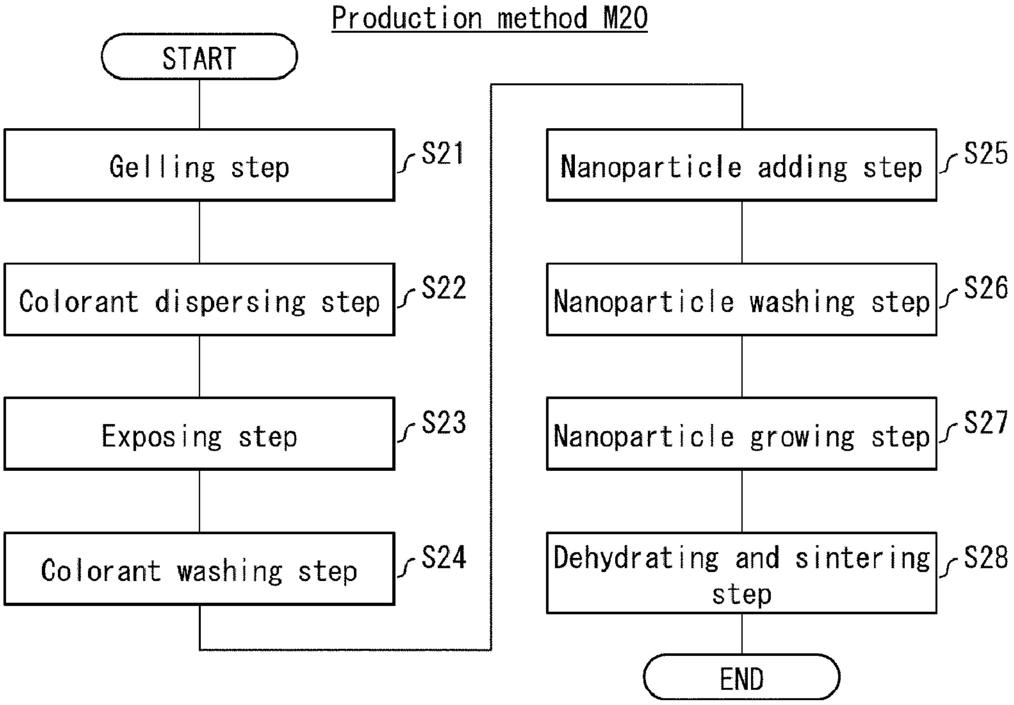
FIG. 13 is a flowchart of a production method in accordance with Example 4.
Figure 14:
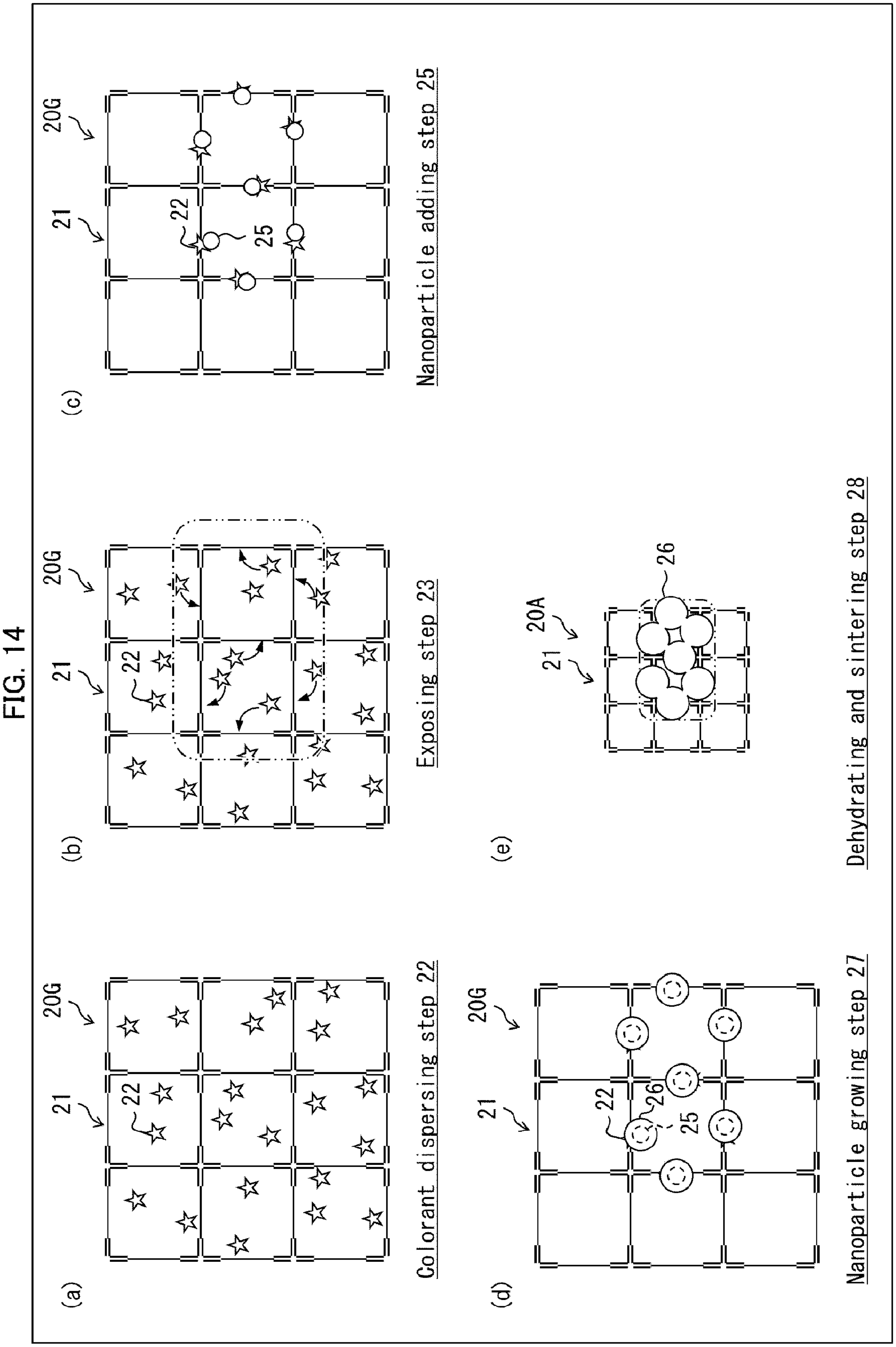
FIG. 14 are schematic views of a gel or a structure in the steps of the production method illustrated in FIG. 13.

A production method M20 in accordance with Example 4, the production method M20 being suitable for producing the light diffraction element 20A illustrated in FIG. 10, will be described with reference to FIGS. 13 and 14. FIG. 13 is a flowchart of the production method M20. FIG. 14 is a schematic view of the gel 20G or the light diffraction element 20A in each of the steps included in the production method M20. (a) of FIG. 14 is a schematic view of the gel 20G having undergone a colorant dispersing step S22. (b) of FIG. 14 is a schematic view of the gel 20G in the exposing step S23. (c) of FIG. 14 is a schematic view of the gel 20G having undergone a nanoparticle adding step S25. (d) of FIG. 14 is a schematic view of the gel 20G having undergone a nanoparticle growing step S27. (e) of FIG. 14 is a schematic view of the light diffraction element 20A obtained by carrying out a dehydrating and sintering step S28. Note that for convenience of description, a member having the same function as the member described in the above Examples is assigned the same reference sign, and the description thereof is not repeated. Note that the production method M20 is based on the InpFab process disclosed in Non-Patent Literature 1, and uses the gel 20G containing the triblock copolymers 21.

As illustrated in FIG. 13, the production method M20 includes: a gelling step S11; the colorant dispersing step S12; the exposing step S13; a colorant washing step S14; the nanoparticle adding step S15; a nanoparticle washing step S16; the nanoparticle growing step S17; and the dehydrating and sintering step S18.

The gelling step S11 is a step of obtaining the gel 20G prepared by allowing, to swell in water, the triblock copolymers 21 each of which includes the first segment 211 and the second segment 212 that are alternately bound together and the total number of segments of each of which is three. Although the triblock copolymers 21 are used to prepare the gel 20G in the gelling step S11 of Example 4, a multi-block copolymer the total number of segments of which is not less than four may be used instead of the triblock copolymer 21.

As the triblock copolymer 21 including the segment 211 and the segment 212 (see, for example, (a) of FIG. 9), a triblock copolymer selected from among those commercially available can be purchased as appropriate in consideration of the degrees of polymerization of the segment 211 and the segment 212. Alternatively, the segment 211 and the segment 212 may be produced by a precision polymerization method so as to have desired degrees of polymerization, and those segments may be used to produce the triblock copolymer 21.

First, a solution of the triblock copolymers 21 in N, N-dimethylformamide (DMF) is prepared. The concentration of the triblock copolymers 21 is not limited to any particular concentration, but is, for example, 20 weight %. With the solution, a mold having a predetermined shape (the shape of a rectangular parallelepiped, in Example 4) is filled. Next, the surface of the solution is exposed to water vapor for several minutes, so that a weak gel of the triblock copolymers 21 is obtained. This weak gel is then immersed in water for three days, so that the gel 20G is obtained.

In a case where the gel 20G containing the triblock copolymers 21 that are desired is commercially available, such triblock copolymers 21 can be purchased and the gelling step S11 can be omitted accordingly.

The colorant dispersing step S12 is an aspect of the first step, and is a step of dispersing the colorants 22 in the gel 20G (see (a) of FIG. 14). In FIG. 14, the segment 211 and the segment 212 of the triblock copolymer 21 are indicated by a double line and a solid line, respectively. Further, illustration of reference signs 111 and 112 are omitted. Note that the colorant 22 used in Example 4 is obtained by substituting an aminomethyl group for the carboxyl group of fluorescein illustrated in (b) of FIG. 9.

The exposing step S13 is an aspect of the second step, and is a patterning step carried out by exposing to light a predetermined region of the triblock copolymers 21 of the gel 20G having the colorants 22 dispersed therein (see (b) of FIG. 14). The two-dot chain line illustrated in (b) of FIG. 14 schematically indicates the region to be exposed. The colorants 22 absorb the energy of light applied by this exposure, and are bound to the block polymers of the segments 212 accordingly (see (b) of FIG. 9). In order to three-dimensionally expose to light a desired region of the gel 20G having the shape of a rectangular parallelepiped, it is preferable to use an exposure process performed by two-photon absorption method. By controlling the amount of exposure in the exposing step S13, it is possible to control the amount of the colorants 22 bound to the segment 212. Thus, for example, among the subcells $\mathbf{202}_{11}$, $\mathbf{202}_{12}$, $\mathbf{202}_{21}$, and $\mathbf{202}_{22}$ of the microcell 202 that are illustrated in FIG. 11, a region corresponding to the subcells having a high refractive index should be set to receive a high amount of exposure, and a region corresponding to the subcells having a low refractive index should be set to receive a low amount of exposure.

The exposing step S13, and the steps (described later) that are the nanoparticle adding step S15, nanoparticle washing step S16, the nanoparticle growing step S17, and the dehydrating and sintering step S18 are known as the InpFab method. These steps are therefore briefly described in Example 4.

The colorant washing step S14 is an aspect of the third step, and is a step of washing the gel 20G having undergone the patterning, and thereby removing the colorants 22 that are unreacted and that remain in the gel 20G. By performing this step, only the colorants 22 that are bound to the segments 212 in the exposed region remain inside the structure 20. Therefore, the colorants 22 remain only in the region having undergone the patterning carried out by exposure.

The nanoparticle adding step S15 is a step of modifying the colorants 22 with nanoparticles 25 (made of, for example, gold) (see (c) of FIG. 14).

The nanoparticle washing step S16 is a step of washing the gel 20G that has been subjected to the modification of the colorants 22 with the nanoparticles 25, and thereby removing the nanoparticles that are not bound to the colorants 22 and that remain in the gel 20G.

The nanoparticle growing step S17 is a step of further growing the nanoparticles 25 with which the colorants 22 have been modified, and thereby increasing the amount of a high-refractive index material contained in the gel 20G (see (d) of FIG. 14). In (d) of FIG. 14, the nanoparticles 25 are indicated by a dashed line, and particles 26 after growth are indicated by a solid line.

The dehydrating and sintering step S18 is an aspect of the fourth step, and is a step of removing water from the triblock copolymers 21 from which the colorants 22 have been removed, and thereby shrinking the triblock copolymers 21, so that the light diffraction element 20A is obtained (see (e) of FIG. 14). By carrying out this step, the gel 20G is reduced in size while maintaining the geometrical similarity to the gel 20G yet to be dehydrated. For convenience, the reduction ratio is determined such that the size of the gel 20G is reduced by half due to the dehydration, in (e) of FIG. 14. It should be noted that an actual reduction ratio of the gel 20G associated with the dehydration depends on the structure of the triblock copolymers 21 and the percentage of water content of the gel 20G (in other words, the extent of swelling). For example, with the triblock copolymers 21 of Example 4 (see (a) of FIG. 9), when the percentage of water content of the gel 20G is approximately 83%, the reduction ratio associated with the dehydration is approximately 1/10.

In this regard, because the variation that can be produced in pitch p between the cross-linking points 241 in the polymer matrix 24 of the gel 20G is small as illustrated in FIG. 12, it is possible to reduce deformation that can be caused in association with the shrinkage of the gel 20G. As a result, the region having undergone the patterning in the exposing step S13 (the region indicated by the two-dot chain line in (e) of FIG. 14) is also reduced in size, while maintaining the geometrical similarity to the region that has undergone the patterning and yet to be dehydrated. It is therefore possible to reduce deformation of the light diffraction element 20A produced by the production method M20, in comparison with a structure produced by the conventional InpFab process.

Further, the dehydrating and sintering step S18 is carried out by heating, in an oven, the gel 20G having undergone the nanoparticle growing step S17. For the purpose of successfully maintaining the shape, the temperature of the dehydration step is preferably set to be lower than the heatproof temperature of the polymer used and the boiling point of the solvent used. For example, in a case of a hydrogel composed of water and an acrylic acid-based substance, it is preferable to dry the hydrogel at a temperature of 60° C. to 95° C. for approximately 30 minutes to 120 minutes. Further, vacuum drying is also efficient when performed after drying and shrinking progress to some extent. The sintering is preferably performed by heating the gel 20G in the shortest possible time at a temperature somewhat lower than the melting point of the nanoparticles, so that only the surface of the nanoparticles melts. Exposing to high temperature for a long time is likely to cause defects such as damage to the gel and oxidation of metal nanoparticles. To prevent the oxidation of metal nanoparticles, it is preferable to perform the sintering under an inert atmosphere or in a vacuum. Further, the dehydrating and sintering step may be performed under a combination of more than one heating condition. For example, in the first half of the dehydrating step, the triblock copolymers 21 are mostly dehydrated under an atmospheric pressure with settings of a heating temperature of the oven of 90° C. and a heating time of 1 hour, and the triblock copolymers 21 are then dried for additional 30 minutes with the same temperature setting while performing evacuation via a vacuum pump. In the subsequent sintering step, with the evacuation being continued, the heating temperature of the oven is switched to 400° C. and the heating time is switched to 3 minutes, so that the particles 26 contained in the triblock copolymers 21 are sintered. As a result, the particles 26 contained in the triblock copolymers 21 firmly adhere to each other. This makes it possible to increase the strength of the microcells 202 (see FIG. 10) of the light diffraction element 20A. Further, regarding the sintering step, the sintering method is not limited to the melting of the nanoparticles through heating, but an instantaneous sintering method by irradiation using a laser, a xenon flash lamp, or the like may be employed.

(Main Points)

A light diffraction element in accordance with a first aspect of one or more embodiments employs a configuration in which the light diffraction element includes a plurality of microcells disposed along a specific plane, the plurality of microcells each including a plurality of subcells, the plurality of subcells each having a refractive index with respect to at least one of in-plane directions of the specific plane, the refractive index being any of n predetermined refractive indexes, where n is an integer of not less than 2.

Each microcell includes a plurality of subcells. Thus, the refractive index of each microcell depends on the average of the respective refractive indexes of the corresponding subcells. In addition, the refractive index of each subcell is selected from among n predetermined refractive indexes. This makes it possible to determine the refractive index of each microcell as appropriate. Each microcell delays the phase of light passing therethrough, according to the refractive index thereof. This makes it possible to optically carry out a predetermined computation by causing waves of the light to interfere with each other, the waves each having a phase shifted according to the refractive index of the corresponding microcell. It is therefore possible to provide the present light diffraction element that is a light diffraction element in which the respective refractive indexes of the plurality of microcells are individually set.

The light diffraction element in accordance with a second aspect of one or more embodiments employs, in addition to the above configuration of the light diffraction element in accordance with the first aspect, a configuration in which the plurality of subcells are substantially uniform in thickness.

In the present light diffraction element, the subcells are substantially uniform in thickness. Thus, the microcells are substantially uniform in thickness. This makes it possible to make the aspect ratios of the respective microcells substantially uniform, in comparison with a light diffraction element in which the thicknesses of a plurality of microcells are individually set. The present light diffraction element is therefore capable of reducing deformation of the microcells that can be caused when a light diffraction element in which the respective thicknesses of the plurality of microcells are individually set is produced by stereolithography, the deformation being due to the variation in aspect ratio among the microcells.

Note that the phrase "the subcells being substantially uniform in thickness" refers to a case in which, for example, all of the thicknesses of the subcells are within a range of plus or minus 10% from the average of the thicknesses.

The light diffraction element in accordance with a third aspect of one or more embodiments employs, in addition to the above configuration in accordance with the first aspect or the second aspect, a configuration in which the plurality of subcells each include: multi-block copolymers each of which includes a first segment that includes a block polymer containing a mesogenic group having liquid crystallinity and a second segment that includes a block copolymer not containing the mesogenic group, the first segment and the second segment being alternately attached to each other, and the total number of segments of each of which is not less than 2; and a guide for making the multi-block copolymers self-organized, and the mesogenic group in each of the plurality of subcells has an orientation direction which is any of n predetermined orientation directions.

With the above configuration, the mesogenic group included in the block polymer of the first segment has any of the n predetermined orientation directions in each subcell. The refractive index of the mesogenic group varies according to the angle formed by the longer axis direction of the mesogenic group and the polarization direction of linearly-polarized light which enters the subcells. Accordingly, when linearly-polarized light enters the present light diffraction element, the refractive index of each subcell is any of the n predetermined refractive indexes. Thus, in the present light diffraction element, a multi-block polymer in which a mesogenic group is included in one of the segments and a guide are used to provide the subcells.

The light diffraction element in accordance with a fourth aspect of one or more embodiments employs, in addition to the above configuration in accordance with the third aspect, a configuration in which the guide has a surface that has a polarity of either hydrophobicity or hydrophilicity, and in the multi-block copolymers, one of the first segment and the second segment is hydrophobic and the other is hydrophilic.

With the above configuration, the multi-block copolymers are arranged such that one of the first segment and the second segment that has the same polarity as does the surface of the guide moves closer to the guide, and the other, having a polarity different from that of the surface of the guide, moves away from the guide. This makes it possible to unfailingly make the orientation directions of the mesogenic groups the same. It is therefore possible to unfailingly control the refractive index of each subcell.

The light diffraction element in accordance with a fifth aspect of one or more embodiments employs, in addition to the above configuration in accordance with the first aspect or the second aspect, a configuration in which each of the plurality of subcells contains a polymer matrix including polymers, the polymers each has a part to which a bound colorant, a colorant, and nanoparticles are bound in this order, and the nanoparticles have a greater refractive index than the polymer matrix does.

With the above configuration, by determining n types of amounts or concentrations of the colorants and the nanoparticles to be bound to the polymers and then selecting, for each subcell, the amount or the concentration of the colorants and the nanoparticles from among the n types, it is possible to set the refractive index of that subcell to any of the n predetermined refractive indexes. Therefore, in the present light diffraction element, the polymer matrix including polymers to which the colorants and the nanoparticles are bound is used to provide the subcells.

The light diffraction element in accordance with a sixth aspect of one or more embodiments employs, in addition to the above configuration in accordance with the fifth aspect, a configuration in which the polymer matrix includes multi-block copolymers in each of which a first segment and a second segment are alternately bound together and the total number of segments of each of which is not less than three; the first segment and the second segment each include one or more block copolymers; the first segment is hydrophobic and the second segment is hydrophilic; in each of the multi-block copolymers, a colorant and nanoparticles are bound in this order to the first segment or the second segment; and the nanoparticles have a greater refractive index than the polymer matrix does.

According to the above configuration, as the polymers of the polymer matrix, multi-block copolymers are employed. The respective block polymers of the first segment and the second segment are in the form of a straight chain. The segments having hydrophobic and hydrophilic are alternately bound together and the total number of segments is not less than three. Accordingly, when the first segments and the second segments are dispersed in a solvent which is hydrophilic or hydrophobic, the segments having a polarity opposite to that of the solvent agglomerate in the solvent. These agglomeration sites provide physical cross-linking points, and thus allow the formation of a swollen gel. For example, when block polymers each including three segments that are hydrophobic segment/hydrophilic segment/hydrophobic segment are dispersed in water, the hydrophobic segments located at the opposite ends of the plurality of block polymers gather to agglomerate and provide physical cross-linking points, to be capable of being in a gel form. The respective block polymers of the first segment and the second segment can be produced by a precision polymerization method. It is therefore possible to make small the respective molecular weight dispersions of the first segment and the second segment. This allows a reduction in the variation that can be produced in a pitch between the cross-linking points in the polymer matrix, in the gel obtained by swelling the multi-block copolymers with use of the solvent. It is therefore possible in the present light diffraction element to reduce deformation that can be caused in the subcells, in comparison with a light diffraction element produced by the conventional InpFab process.

The light diffraction element in accordance with seventh aspect of one or more embodiments employs, in addition to the above configuration in accordance with the sixth aspect, a configuration in which the multi-block copolymers are each a triblock copolymer the total number of segments of which is three, and each include two first segments each of which is the first segment and a second segment lying between the two first segments.

With the above configuration, a hydrophilic solvent (e.g., water) can be used as the solvent for swelling the multi-block copolymers.

The light diffraction element in accordance with an eighth aspect of one or more embodiments employs, in addition to the above configuration in accordance with any one of the first to seventh aspects, a configuration in which when light having a predetermined wavelength λ enters the plurality of microcells, each of the plurality of microcells shifts a phase of the light according to the refractive index of that microcell, and the plurality of microcells each have a cell size which is equal to or smaller than the wavelength λ.

With the above configuration, each microcell is capable of delaying the phase of light having a wavelength λ.

The light diffraction element in accordance with a ninth aspect of one or more embodiments employs, in addition to the above configuration in accordance with the eighth aspect, a configuration in which the plurality of microcells each have a cell size which is equal to or smaller than the wavelength λ.

With the above configuration, each microcell is capable of efficiently delaying the phase of light having a wavelength λ.

An optical computing device in accordance with a tenth aspect of one or more embodiments employs a configuration in which the optical computing device includes N light diffraction elements each of which is the light diffraction element described in any one of the first to ninth aspects, where N is an integer of not less than 2, the N light diffraction elements having respective regions which coincide with each other, the respective regions each having the plurality of microcells provided therein.

With the above configuration, it is possible to use the light diffraction element in which the refractive indexes of the plurality of microcells are individually set, to provide an optical computing device.

A light diffraction element production method in accordance with an eleventh aspect of one or more embodiments is a method for producing a light diffraction element that includes a plurality of microcells each of which includes a plurality of subcells. According to the present production method, the plurality of subcells each include: multi-block copolymers each of which includes a first segment that includes a block polymer containing a mesogenic group having liquid crystallinity and a second segment that includes a block copolymer not containing the mesogenic group, the first segment and the second segment being alternately attached to each other, and the total number of segments of each of which is not less than 2; and a guide for making the multi-block copolymers self-organized, and the method includes the steps of: providing the guide on a main surface of a substrate such that the mesogenic group in each of the plurality of subcells has an orientation direction which is an any of n predetermined orientation directions; and forming the multi-block copolymers such that the multi-block copolymers cover the guide.

The above configuration produces the same effect that is produced by the light diffraction element in accordance with the third aspect.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical computing device
10, 10*a*, 10*b*, 10*c*: Light diffraction element
11: Microcell group
$\mathbf{11}_{ij}$: Microcell
12: Subcell group
$\mathbf{12}_{k1}$: Subcell
12*g*, $\mathbf{12}g_{k1}$: Guide
12P, $\mathbf{12}\mathrm{P}_{k1}$: Diblock copolymer
S1, S2: Segment
20: Structure
20A: Light diffraction element
20G: Gel (example of fine structure producing gel)
201: Low refractive index portion
202: Microcell
$\mathbf{202}_{11}$, $\mathbf{202}_{12}$, $\mathbf{202}_{21}$, $\mathbf{202}_{22}$: Subcell
21: Triblock copolymer (example of multi-block copolymer)
211, 212: Segment (examples of first segment and second segment)
22: Colorant
23: Cross-linking agent
24: Polymer matrix
241: Cross-linking point

The invention claimed is:

1. A light diffraction element comprising:
microcells disposed along a plane and each of which includes subcells, wherein
each of the subcells has a refractive index with respect to at least one of in-plane directions of the plane, and
the refractive index is one of n predetermined refractive indexes, where n is an integer of not less than 2.

2. The light diffraction element according to claim 1, wherein the subcells are substantially uniform in thickness.

3. The light diffraction element according to claim 1, wherein
each of the subcells includes:
multi-block copolymers each of which includes a first segment that includes a block polymer containing a mesogenic group having liquid crystallinity and a second segment that includes a block copolymer not containing the mesogenic group; and
a guide that makes the multi-block copolymers self-organized,
the mesogenic group in each of the subcells has an orientation direction which is one of n predetermined orientation directions,
the first segment and the second segment are alternately attached to each other, and
a total number of segments of each of the first segment and the second segment is not less than 2.

4. The light diffraction element according to claim 3, wherein
the guide has a surface that has a polarity of either hydrophobicity or hydrophilicity, and
in the multi-block copolymers, one of the first segment and the second segment is hydrophobic and the other of the first segment and the second segment is hydrophilic.

5. The light diffraction element according to claim 1, wherein each of the subcells contains a polymer matrix including polymers, each of the polymers has a part to which a bound colorant and nanoparticles are bound in this order, and the nanoparticles have a refractive index larger than the polymer matrix does.

6. The light diffraction element according to claim 5, wherein the polymer matrix includes multi-block copolymers in each of which a first segment and a second segment are alternately bound together, a total number of segments of each of the first segment and the second segment is not less than three, each of the first segment and the second segment includes one or more block copolymers, the first segment is hydrophobic and the second segment is hydrophilic, in each of the multi-block copolymers, a colorant and nanoparticles are bound in this order to the first segment or the second segment, and the nanoparticles have a refractive index larger than the polymer matrix does.

7. The light diffraction element according to claim 6, wherein each of the multi-block copolymers is a triblock copolymer, a total number of segments of the triblock copolymer is three, and each of the multi-block copolymers includes two first segments, each of which is the first segment, and the second segment between the two first segments.

8. The light diffraction element according to claim 1, wherein when light having a predetermined wavelength enters the microcells, each of the microcells shifts a phase of the light according to the refractive index of each of microcells.

9. The light diffraction element according to claim 8, wherein each of the microcells has a cell size equal to or smaller than the wavelength.

10. An optical computing device comprising:

N light diffraction elements each of which is the light diffraction element according to claim 1, where N is an integer of not less than 2, wherein the N light diffraction elements have respective regions which coincide with each other, and each of the respective regions has the microcells.

11. The light diffraction element according to claim 1, wherein the microcells each include the subcells arranged in a matrix.

* * * * *